United States Patent [19]
Karasaki et al.

[11] Patent Number: 5,214,464
[45] Date of Patent: May 25, 1993

[54] CAMERA SYSTEM

[75] Inventors: Toshihiko Karasaki; Hiroshi Ootsuka; Norio Ishikawa; Toshihiko Ishimura; Masataka Hamada; Tokuji Ishida; Masayuki Ueyama, all of Osaka, Japan

[73] Assignee: Minolta Camera Kabushiki Kaisha, Osaka, Japan

[21] Appl. No.: 636,608

[22] Filed: Dec. 31, 1990

Related U.S. Application Data

[62] Division of Ser. No. 315,845, Feb. 27, 1989, Pat. No. 5,003,336.

[30] Foreign Application Priority Data

| Feb. 29, 1988 | [JP] | Japan | 63-48128 |
| Feb. 29, 1988 | [JP] | Japan | 63-48129 |
| Feb. 29, 1988 | [JP] | Japan | 63-48130 |
| Feb. 29, 1988 | [JP] | Japan | 63-48131 |
| Feb. 29, 1988 | [JP] | Japan | 63-48132 |
| May 17, 1988 | [JP] | Japan | 63-119685 |
| May 17, 1988 | [JP] | Japan | 63-119688 |

[51] Int. Cl.⁵ .................................. G03B 17/00
[52] U.S. Cl. ............................. 354/286; 354/400
[58] Field of Search ............... 354/400, 402, 286, 455

[56] References Cited

U.S. PATENT DOCUMENTS

| Re. 33,015 | 8/1989 | Nakai et al. ............. 354/286 |
| 4,477,164 | 10/1984 | Nakai et al. ............. 354/286 |
| 4,572,638 | 2/1986 | Nakai et al. . |
| 4,671,640 | 6/1987 | Akada et al. . |
| 4,687,917 | 8/1987 | Kusaka et al. . |
| 4,768,052 | 8/1988 | Hamada et al. . |
| 4,774,539 | 9/1988 | Suda et al. . |
| 4,803,509 | 2/1989 | Nakai et al. ............. 354/286 |
| 4,812,868 | 3/1989 | Utagawa et al. . |
| 4,816,663 | 3/1989 | Utagawa et al. . |
| 4,853,732 | 8/1989 | Suzuki et al. ............. 354/402 |
| 4,859,842 | 8/1989 | Suda et al. . |
| 4,878,079 | 10/1989 | Hamada et al. . |
| 4,908,505 | 3/1990 | Taniguchi et al. . |
| 4,945,376 | 7/1990 | Kawasaki et al. ............. 354/400 |
| 5,021,817 | 6/1991 | Suzuki et al. ............. 354/402 |

FOREIGN PATENT DOCUMENTS

| 61-159611 | 7/1986 | Japan . |
| 62-189415 | 8/1987 | Japan . |
| 63-131111 | 3/1988 | Japan . |
| 63-289537 | 11/1988 | Japan . |

*Primary Examiner*—Russell E. Adams
*Attorney, Agent, or Firm*—Burns, Doane, Swecker & Mathis

[57] ABSTRACT

According to this invention, a camera system has a camera body and a first and second lenses exchangeable to the camera body. The first lens comprises a device for outputting first data which indicates the first lens belongs to a first lens type. The second lens comprises a device for outputting second data which indicates the second lens belongs to a second lens type and third data with respect to the characteristic of the second lens. The camera body comprises: a device for inputting the data from the outputting device of the first or second lens attached to the camera body, a device for discriminating the lens type based on whether the inputted data is the first or second data, a device for storing data with respect to the characteristic of the lens belonging to the first lens type, and a processing device for carrying out a process based on the third data when the discriminating device judges the attached lens belongs to the second lens type and controlling it based on the stored data in the storing device when the discriminating device judges the attached lens belongs to the first lens type. The discriminating means judges the attached lens belongs to the first lens type.

14 Claims, 28 Drawing Sheets

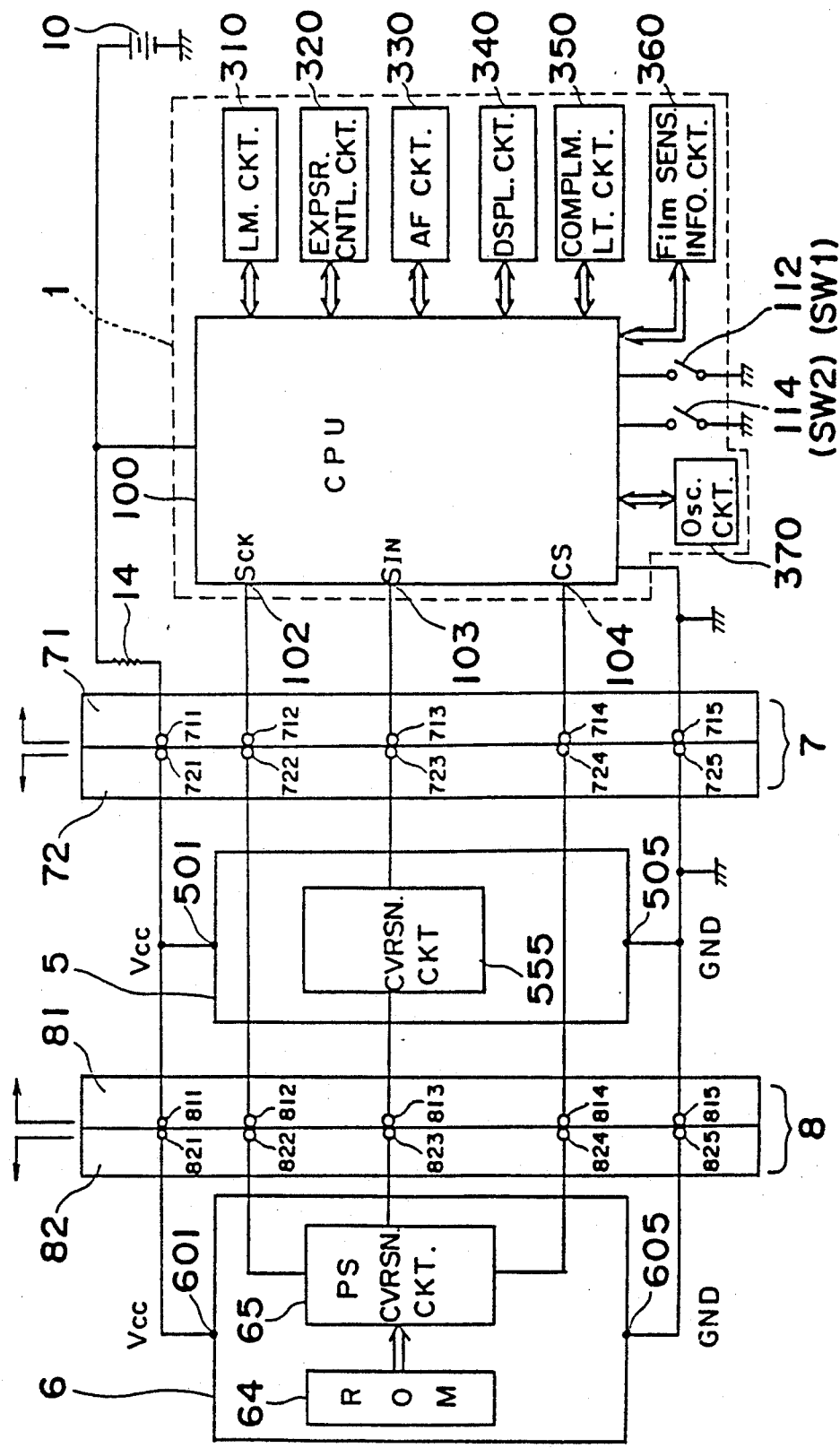
Fig. 2-(a)

Fig. 2-(b)
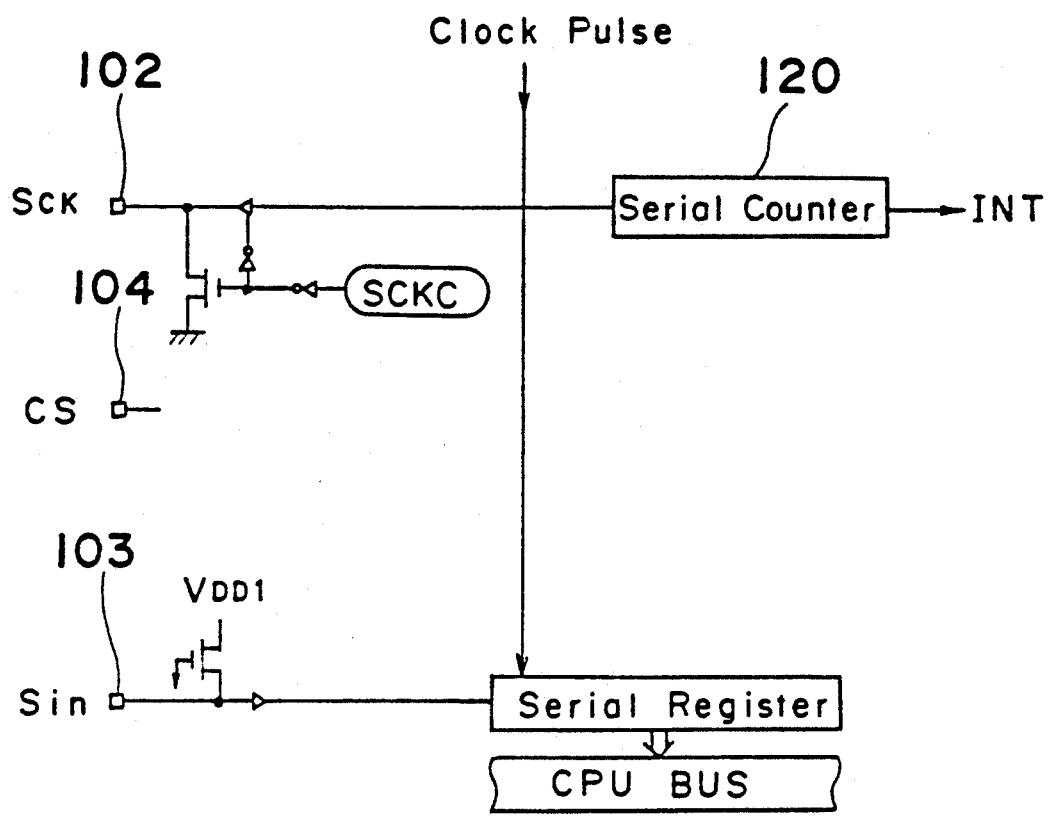
Fig. 4
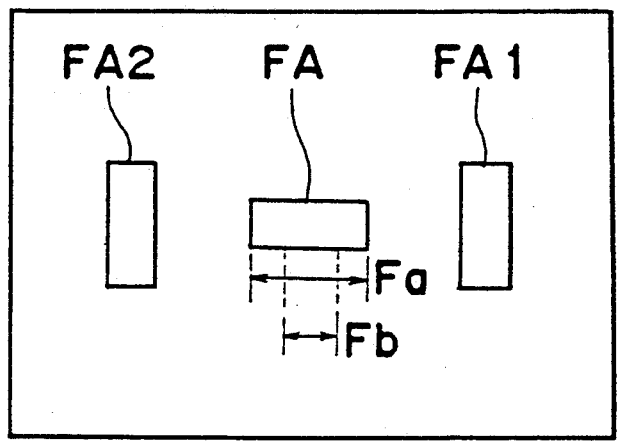

Fig. 12

| | | | | | |
|---|---|---|---|---|---|
| Without Converter Lens (CNVSET=0) | FA, FA1, FA2 | | Fa | | non-detectable |
| With Converter Lens (CNV SET =1) | Non-Admission (WB=0) | FA, FA1, FA2 | Fa | Fb | non-detectable |
| | Admission (WB=1) | FA, FA1, FA2 | | Fb | non-detectable |
| | | J4 J3 | | J2 J1 | (AFAVo) |

→ Dark Lens

Fig. 24-(a)
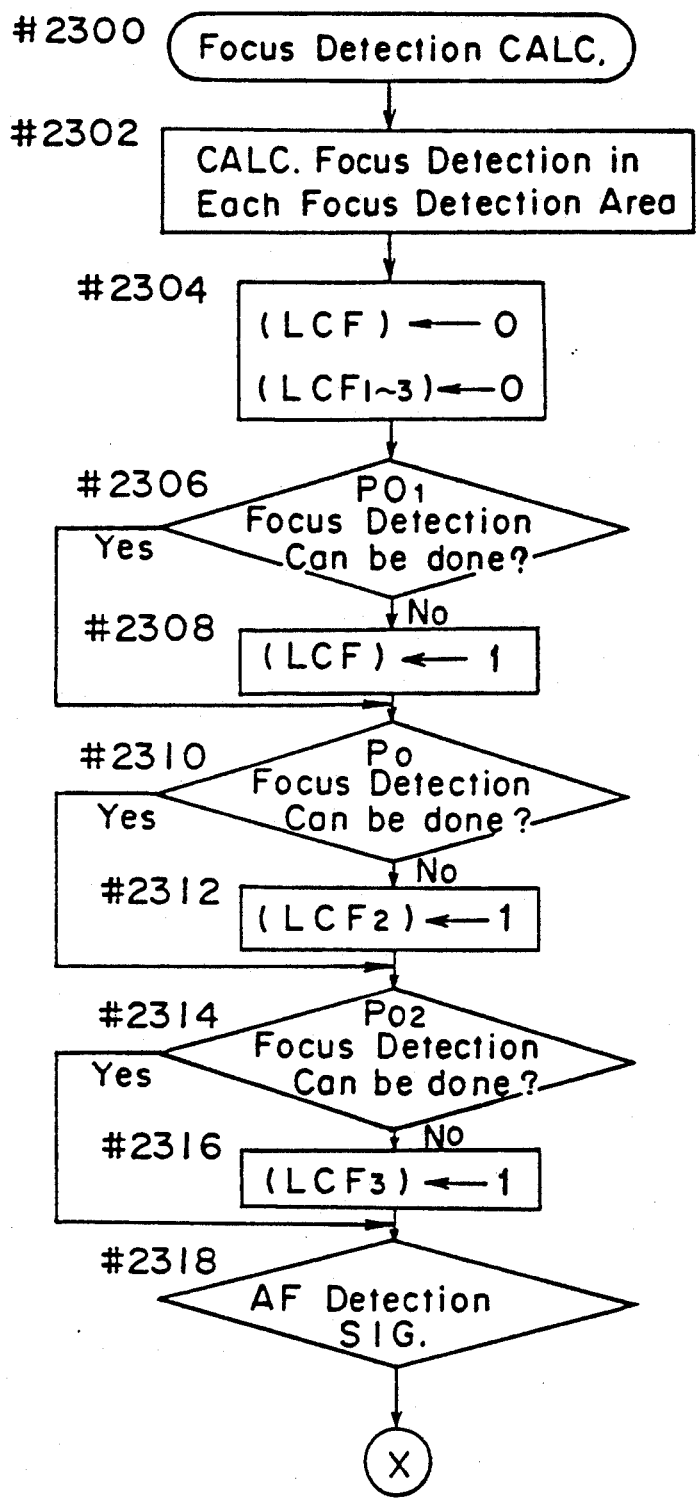

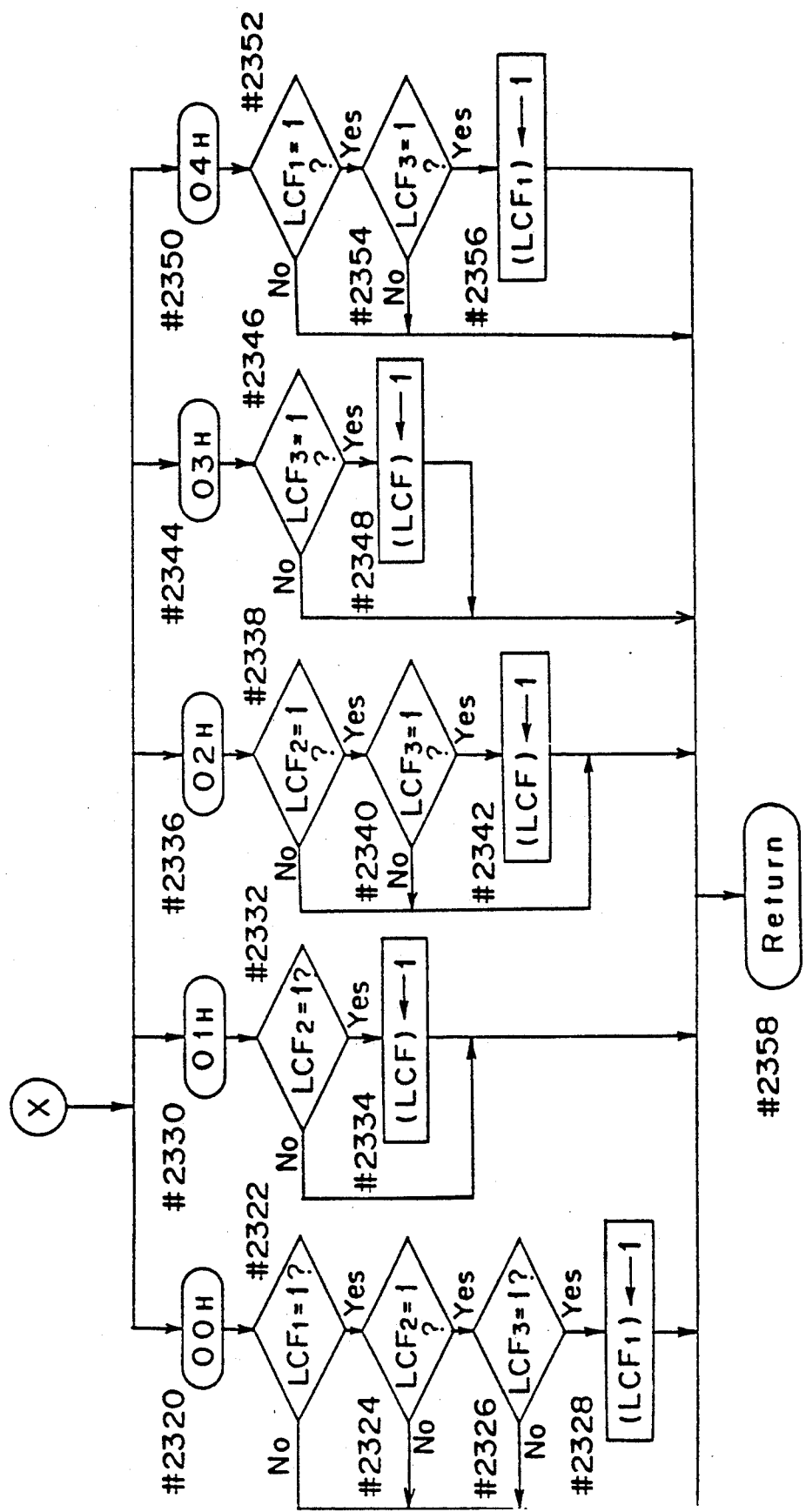
Fig. 24-(b)

CAMERA SYSTEM

This application is a divisional of application Ser. No. 07/315,845, filed Feb. 27, 1989, now U.S. Pat. No. 5,003,336.

BACKGROUND OF THE INVENTION

1. Field of the Invention

The present invention relates to a camera system comprising an exchangeable lens having individual information of its own to be outputted to a camera body and the camera body which performs various operations using the information inputted thereto from the exchangeable lens. The present invention further relates to a camera system having a plurality of focus detection areas.

2. Description of the Prior Art

Individual information of lenses to be required to be controlled by a camera body increases as a camera system has more functions such as an automatic focusing control. Heretofore, information such as a fully open aperture value is mechanically transmitted from a lens to the camera body. Therefore, the number of kinds of information is small and the information cannot be transmitted from the lens to the camera body with a high accuracy. In order to overcome this problem, various camera systems are proposed. According to a known camera system, a read only memory (ROM) which stores the individual data of respective lenses is mounted in the lens so as to electrically transmit the lens data from the lens to the camera body.

The specification of German Patent No. 3518887 discloses a camera system in which a storing means provided in each of the lenses stores an electric signal peculiar to each of the lenses while the camera body stores the lens data on these lenses. According to this camera system, the lens data stored in the camera body is selected in response to an electric signal transmitted from the lens, whereby an exposure control appropriate to the lens can be made.

But as the camera system is provided with more and more functions such as a focus condition detection in a plurality of focus detection areas, i.e., when lens data to be controlled by the camera body increases further, the following problem occurs in the above-described cameras: if a conventional lens which includes the ROM which stores the lens data necessary only for the function of the conventional camera, is mounted on a developed camera body, the camera body can not operate the developed function operate thereof due to the shortage of lens data even though the mounting portion of the lens barrel can be attached to the mounting portion of the camera body.

The provision of a storing means in the camera body which stores the individual lens data of respective lenses does not allow the occurrence of such a problem, but the storing means is required to store a large amount of data therein, which is not preferable in view of practical use.

Next, lens data necessary for detecting a focus condition is considered. Heretofore, even if an object is sufficiently bright and has a high contrast, in some cases, a focus detecting operation must be controlled depending on the configuration and condition of a lens in a camera which has a single focus detection area and performs only the focus condition detection of an object present in an area including an optical axis. Such a control must be made in the following cases: The condition to be determined by diameter and position of the exit pupil of the lens such as a reflecting telephoto lens is not suitable for a focus detecting element; the light reflected from an object is not incident on an entire focus detecting element because the diameter of the exit pupil of a lens is too small (a vignetting occurs in this case); and a macro-photographing in which the position of the diameter of the exit pupil changes, the depth of focus becomes shallow, and the aperture value becomes great.

The specification of U.S. Pat. No. 4,509,842 discloses the following art. A signal, indicating that it is impossible to detect a focus condition, is stored in a storing means provided in a lens such as a reflecting telephoto lens. It is decided whether or not a fully open aperture value stored in the lens as lens data exceeds a predetermined value (for example, F=5.6). And a signal, indicating that a focus condition cannot be detected, is outputted from the lens when the lens is used to carry out a macro-photographing.

However, the above-described arts all relate to the camera system which has a single focus detection area and detects only the focus condition of an object present in an area including an optical axis, i.e., these arts cannot be applied to a camera system having a plurality of focus detection areas in a photographing picture plane. That is, the known camera system is provided with only data which indicates whether or not it is possible to detect a focus condition on an axial focus detection area. Contrary to such a camera system, in the camera system in which a plurality of focus detection areas are provided in the photo-taking picture plane, a focus detection area which can be used, is varied according to the condition determined by the configuration of the exit pupil of the lens and the diameter as well as the position of the exit pupil thereof. Therefore, it is necessary to store as lens data the information of respective lenses in the storing means provided in the lens, which indicates which of a plurality of focus detection areas can be used.

When the conventional lens used in the camera system having a single focus detection area is used in a camera system having a plurality of focus detection areas, as described above, the problem that the lens data is short occurs.

It is preferable that a focus condition is detected by using a great area in order to detect a focus condition with a high accuracy, but a vignetting occurs when a lens whose exit pupil is small (for example, a telephoto lens whose focal length is too long) is used although there is no problem with a lens whose exit pupil is great. In this case, a focus condition cannot be detected. In order to detect a focus condition not only for a lens whose exit pupil is great, but also for a lens whose exit pupil is small, it is necessary to prevent the occurrence of a vignetting. To this end, it is necessary to reduce a focus detection area, which means that a focus condition cannot be detected with a high accuracy.

That is, the known camera has a problem that the improved accuracy of a focus condition detection is inconsistent with the increase of the number of the kinds of lens which can be used for detecting a focus condition.

The above-described camera system has another problem which is described hereinbelow.

As described previously, in this kind of camera, various kinds of exchangeable lenses are used as a photo-taking lens. A photo-taking lens is composed of only a lens or of a lens and a converter lens for converting the focal length of the photo-taking lens.

The converter lens for use in this kind of camera transfers the lens data transmitted from the lens directly to the camera body in order to enable a focus detecting operation and converts the lens data, which is varied by the converter lens, such as the focal length or the fully open aperture value at the same rate of change as that of the focal length, thus outputting the converted data to the camera body.

Furthermore, according to the known camera body, whether or not a vignetting occurs is detected based on the fully open aperture value obtained from the lens. In this respect, it may be considered whether or not a focus condition can be detected by using the fully open aperture value converted by the converter lens when the lens is used with the converter lens mounted thereon as well.

But the position of the exit pupil of the lens attached to the converter lens may change along the optical axis to a greater extent than the position of the exit pupil of the lens not attached to the converter lens. In this case, it cannot be accurately decided whether or not a focus condition can be detected according to the information of the fully open aperture value which is converted at the same rate of change as that of the focal length due to the operation of the converter lens.

That is, in the known camera system, even though a vignetting does not occur due to the change of the position of the exit pupil, it is decided that the vignetting will occur only according to the information of the fully open aperture value, so that it can be decided that the focus condition can not be detected. In particular, in a camera system having a plurality of focus detection areas, a focus detection area which can be used for detecting a focus condition is changed greatly by the change of the position the exit pupil, thus causing the above problem.

SUMMARY OF THE INVENTION

It is an object of the present invention to provide a camera system capable of achieving a novel function using a photo-taking lens belonging to the category of the known camera system when the camera body thereof is provided with the novel function not provided with the known camera system.

It is another object of the present invention to provide a camera system capable of determining which of a plurality of focus detection areas can be used depending on each lens.

It is still another object of the present invention to provide a camera system which can increase the number of kinds of lenses capable of detecting a focus condition and selecting focus detection areas suitable for the respective lenses.

It is a further object of the present invention to provide a camera system capable of appropriately deciding which of a plurality of focus detection areas can be used when a converter lens is used.

It is a still further object of the present invention to provide a camera system having a storing means, provided in a lens, for storing information for performing various functions.

In accomplishing these and other objects, there is provided a camera system having a camera body and a first and second lenses exchangeable to said camera body, comprising: said first lens comprising means for outputting first data which indicates said first lens belongs to a first lens type; said second lens comprising means for outputting second data which indicates said second lens belongs to a second lens type and third data with respect to the characteristic of said second lens, said camera body comprising: means for inputting the data from the outputting means of said first or second lens attached to said camera body, means for discriminating the lens type based on whether the inputted data is the first or second data, means for storing data with respect to the characteristic of said lens belonging to the first lens type, and a processing means for carrying out a process based on the third data when the discriminating means judges the attached lens belongs to the second lens type and controlling it based on the stored data in the storing means when the discriminating means judges the attached lens belongs to the first lens type.

In another aspect of the present invention, there is provided a camera system having a camera body and a first and second lenses exchangeable to said camera body, comprising: said first lens comprising means for outputting first data which indicates said first lens belongs to a first lens type; said second lens comprising means for outputting second data which indicates said second lens belongs to a second lens type and third data with respect to the characteristic of said second lens, said camera body comprising: means for inputting the data from the outputting means of said first or second lens attached to said camera body, a first storing means, a second storing means, a third storing means for storing data with respect to the characteristic to said lens belonging to the first lens type, means for making the inputted first and second data store in the first storing means, means for discriminating the lens type based on whether the stored data is the first or second data, and means for making the inputted third data store in the second storing means when the discriminating means judges the attached lens belongs to the second lens type and making the stored data in the third storing means store data in the second storing means when the discriminating means judges the attached lens belongs to the first lens type.

In a further aspect of the present invention, there is provided a camera system detectable focus conditions on a plurality of focus detection areas having a camera body and an exchangeable lens to said camera body, comprising: said lens comprising means for outputting data which indicates which of the focus detection area is able to be used in the focus detection and irrespective of an exit pupil; said camera body comprising means for inputting the data from the outputting means of said attached lens to the camera body, means for selecting the focus detection area based on the inputted data, and means for detecting the focus condition on the focus detection area selected by the selecting means.

In a further aspect of the present invention, there is provided a lens exchangeable to a camera body which can detect focus conditions on a plurality of focus detection areas, comprising means for outputting data which indicates which of the focus detection areas is able to be used in the focus detection.

In a further aspect of the present invention, there is provided a camera body inputted data from a lens, the data indicates an aperture value for focus detection, comprising: a first means for detecting a focus condition with respect to a first focus detection portion; a second means for detecting a focus condition with respect to a second focus detection portion; means for comparing the inputted data with a predetermined value; and means for selecting one of the first and second focus detecting means based on a resultant of the comparing means.

In a further aspect of the present invention, there is provided a camera system having a camera body, an exchangeable lens to said camera body and a converter lens exchangeable between said camera body and said exchangeable lens, comprising; said exchangeable lens comprising means for outputting first data indicative of an aperture value for focus detection and second data; said converter lens comprising means for inputting the data outputted from the outputting means of said exchangeable lens attached to said converter lens, means for converting the inputted first data into third data, and means for outputting the third data and the second data inputted from the outputted means of said exchangeable lens to the inputting means; said camera body comprising means for inputting the second and third data from said converter lens attached to said camera body, a first means for detecting a focus condition with respect to a first focus detection portion, second means for detecting a focus condition with respect to a second focus detection portion, means for comparing the inputted third data with a predetermined value, means for changing the predetermined value based on the inputted second data, and means for selecting one of the first and second focus detecting means based on a resultant of the comparing means.

In a further aspect of the present invention, there is provided a camera system having a camera body, an exchangeable lens to said camera body and a converter lens exchangeable between said camera body and said exchangeable lens, comprising: said exchangeable lens comprising means for outputting first data indicative of an aperture value for focus detection and second data indicative of an admitting degree with respect to a portion of an exit pupil of said exchangeable lens; said converter lens comprising means for inputting the data from the outputting means of said exchangeable lens attached to said converter lens, means for converting the inputted first data into third data, and means for outputting the second and third data; said camera body comprising means for inputting the second and third data from said converter lens attached to said camera body, a first means for detecting a focus condition with respect to a first focus detection portion, a second means for detecting a focus condition with respect to a second focus detection portion, and means for selecting one of the first and second focus detecting means based on second and third data.

In a further aspect of the present invention, there is provided a lens exchangeable to a camera body which can detect focus conditions on a plurality of focus detection areas, comprising means for outputting first data indicative of an aperture value for focus detection and second data indicative of an admitting degree with respect to a position of an exit pupil of said lens.

By the arrangement according to the present invention, since stored in the camera body is the data (e.g. new data) with respect to the characteristic of said first lens (e.g. conventional lens), even if the first lens has no data which is necessary for performing new developed function, the new developed function can be performed. On the other hand, when the discriminating means judges the attached lens is the second lens type, new function can be performed based on the third data in which the second lens has. Only the data necessary for performing the new function at the first lens type is stored in the camera body. Therefore, it is unnecessary to store a great many data in the camera body.

Moreover, by the arrangement according to the present invention, since the camera system capable of determining which of a plurality of focus detection areas can be used depending on a lens, a focus detecting performance is improved and various photo-taking lens can be used. Further, a focus condition can be detected in an appropriate condition depending on the kind of a photo-taking lens. Furthermore, the camera system can increase the number of kinds of lenses capable of detecting a focus condition. Moreover, the camera system can appropriately decide which of a plurality of focus detection areas can be used when a converter lens is used.

BRIEF DESCRIPTION OF THE DRAWINGS

FIG. 2-($a$) is a circuit diagram of a camera body of the system;

FIG. 2-($b$) is a partial view of the circuit;

FIG. 4 is a field view in a finder in the system;

FIG. 12 is an explanatory view showing the relationship between a focus detecting aperture value and a focus detection area.

FIGS. 24$a$ and 24$b$ are flowcharts showing a subroutine for calculating a focus condition detection;

FIGS. 30a and 30b shows an area map of the ROM provided in the lens; and

DETAILED DESCRIPTION OF THE INVENTION

Figure 1:
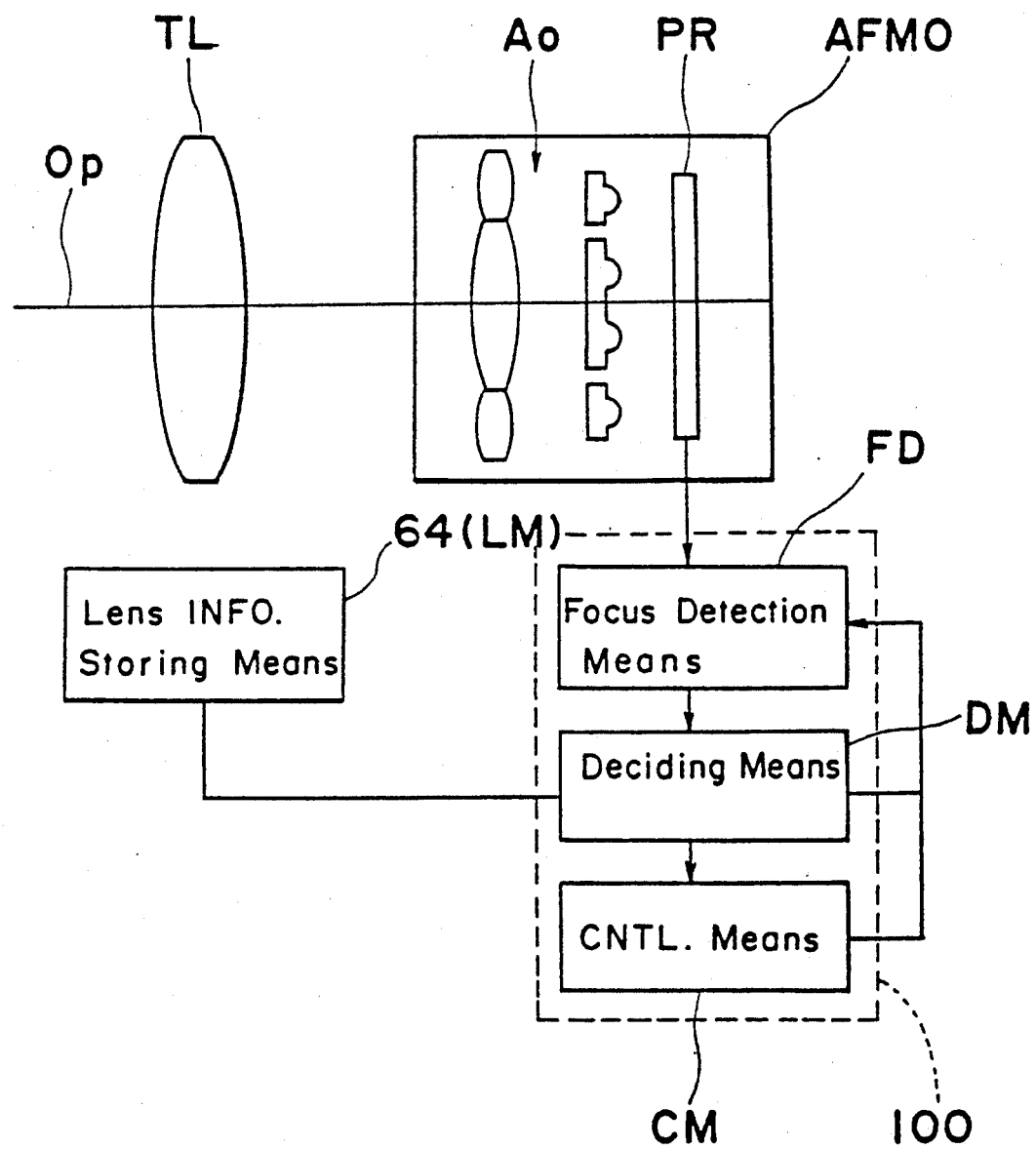
FIG. 1 is a schematic block diagram of a camera system according to one embodiment of the present invention.

Before the description of the present invention proceeds, it is to be noted that like parts are designated by like reference numerals and symbols throughout the accompanying drawings.

Referring to FIG. 2-(a) showing the circuit diagram of a camera body of a camera system in accordance with one preferred embodiment of the present invention, a circuit 1 provided in the camera body and a circuit 5 provided in a converter lens are electrically connected to each other by a group of contacts 711 through 715 mounted on the camera body and a group of contacts 721 through 725 mounted on the converter lens. The contacts 711 through 715 and 721 through 725 are provided on a mount portion 7.

The circuit 5 in the converter lens and a circuit 6 provided in a photo-taking lens are electrically connected to each other by a group of contacts 811 through 815 mounted on the converter lens and a group of contacts 821 through 825 mounted on the photo-taking lens. The contacts 811 through 815 and 821 through 825 are provided on a mount portion 8.

All circuits which are described later are operated by the instruction of a central processing unit 100 (hereinafter referred to as CPU) which controls the operation of the entire system. A constant voltage Vcc is supplied by a power source 10 to the CPU 100, the circuit 5 in the converter lens, and the circuit 6 in the photo-taking lens.

A light measuring circuit 310 performs an A/D conversion of a photoelectrically converted amount (corresponding to the luminance value of an object to be photographed) of a light measured by a light measuring element (not shown) which performs a TTL light measuring. Thus, the light measuring circuit 310 outputs to the CPU 100 the luminance value data $BV_0$ ($BV_0 = BV - AV_0$: $AV_0$ is fully open aperture value of the photo-taking lens) of the object which is calculated by APEX system.

An exposure control circuit 320 controls the operation of the diaphragm mechanism (not shown) of the photo-taking lens and the shutter mechanism (not shown) of the camera body based on the instruction of the CPU 100.

An automatic focus adjusting circuit 330 comprises a focus detecting circuit (not shown) and a control circuit (not shown) for driving the lens.

A display circuit 340 displays photographing information such as the exposure mode and exposure control values (aperture value and shutter speed) of the camera, the number of frames of a film exposed, and the focus condition (in-focus or out of focus) of the photo-taking lens.

A complementary light circuit 350 projects a complementary light on the object when it is impossible to detect a focus condition of the object under a visible light. The construction of the complementary circuit 350 is disclosed in Japanese Patent Application No. 62-141538, and the application of which was filed by the present applicant.

A film sensitivity information circuit 360 transfers the film sensitivity information of a film to the CPU 100 based on a DX code read out from the patrone put in the camera body.

An oscillation circuit 370 supplies a pulse signal to be used as an operation clock to the CPU 100 while various operations are being performed.

A light measuring switch 112 SW1 is closed during the depression of a shutter release button (not shown) through a first half of its full stroke. A release switch 114 SW2 is closed when the shutter release button is completely depressed through the full stroke.

The mount portions 7 and 8 are described hereinbelow. The mount portion 7 provided between the camera body and the converter lens comprises a mount 71 provided on the camera body on which the photo-taking lens is mounted and a mount 72 provided on the converter lens. The mount 8 provided between the converter lens and the photo-taking lens comprises a mount 81 provided on the converter lens and a mount 82 on the photo-taking lens. In the camera of the embodiment, the mounts 71 and 72 of the mount portion 7 comprise five contacts 711 through 715 and 721 through 725, respectively, and the mounts 81 and 82 of the mount portion 8 comprise five contacts 811 through 815 and 821 through 825, respectively. The circuit connection as described below allows a serial communication between the CPU 100 in the circuit 1 provided in the camera body and the circuit 6 provided in the photo-taking lens through the circuit 5 provided in the converter lens.

The CPU 100 provided in the camera body comprises an output terminal 102 Sck for outputting a clock signal to be used for a serial input/output, an input terminal 103 Sin for serially reading the data inputted thereto from the circuit 6 provided in the photo-taking lens, and an output terminal 104 CS for outputting a signal which commands the drive timing of the circuit 6 provided in the photo-taking lens. The contacts 712, 713, and 714 of the mount 71 on the camera body are connected to the clock output terminal 102, the input terminal 103, and the output terminal 104, respectively. The contact 711 is connected to the power source 10 through a resistor 14 for preventing the occurrence of a short-circuit. The contact 715 is connected to the earth line of the circuit 1 in the camera body.

In the converter lens, of the group of five contacts 721 through 725 of the mount 72 connected to the mount 71 on the camera body and the group of five contacts 811 through 815 of the mount 81 connected to the mount 82 on the photo-taking lens, the contact 721 is connected to the contact 811 and to a power source terminal 501 of the circuit 5 in the converter lens, the contact 725 is connected to the contact 815 and to an earth terminal 505 of the circuit 5 in the converter lens, the contact 723 is connected to the contact 813 through a conversion circuit 555 of the circuit 5 in the converter lens, and the contacts 722 and 724 are connected to the contact 812 and 814, respectively.

In the photo-taking lens, of the group of the five contacts 821 through 825 of the mount 82 provided on the photo-taking lens, the contact 821 is connected to a power source terminal 601 of the circuit 6 in the photo-taking lens, the contact 825 is connected to an earth terminal of the circuit 6 in the photo-taking lens, and the contacts 822 through 824 are connected to a parallel/-serial conversion circuit 65 of the circuit 6 in the photo-taking lens.

A ROM 64 of the circuit 6 provided in the photo-taking lens previously stores individual information on the photo-taking lenses. When the PS conversion circuit 65 receives a signal, outputted from clock output terminal 102 of the CPU 100, indicative of the transfer of the lens information, the lens information are read out from the ROM 64 to PS conversion circuit 65 in parallel. The lens information is shown in Table 1 according to the addresses in which the respective lens information is stored.

TABLE 1

| Address | Data | Symbol |
|---|---|---|
| 01 | Lens Mounting Signal | ICP |
| 02 | Fully Open Aperture Value | $AV_0$ |
| 03 | Minimum Aperture Value | $AV_{max}$ |
| 04 | Variation Amount Data of Aperture Value due to Zooming | $\Delta AV$ |
| 05 | Focal Length | f |
| 06 | Conversion Coefficient for Finding Drive Amount according to Defocus Amount | K |
| 07 | AF Aperture Value | $AFAV_0$ |
| 08 | Off-axial Focus Detection Signal | $OFF_{ok}$ |
| 09 | Axial Focus Detection Signal | $FAEN_2$ |
| 0A | Off-axial Focus Admitting Signal | WB |
| 0B | AF Lens Deciding Signal | AFC |
| 0C | Converter Lens Mounting Signal | CNVSET |

The PS conversion circuit 65 of the circuit 6 in the photo-taking lens converts the parallel signal applied from the ROM 64 into serial signals, thus outputting the serial signals to the circuit 5 in the converter lens through the contacts 823 and 813.

Of the information inputted to the conversion circuit 555 of the circuit 5 in the converter lens, the conversion circuit 555 converts the lens information, for example, an aperture value which is modified by the mounting of the converter lens. The conversion circuit 555 outputs other lens information as they are to the input terminal 103 of the CPU 100 through the contacts 723 and 713. The conversion circuit 555 also converts the data of a focal length etc. in addition to the aperture value.

FIG. 2-(b) shows in detail the three input/output terminals 102, 103, and 104 provided in the CPU 100 shown in FIG. 2-(a).

A high enable circuit is connected to the output terminal 102 and while a serial port control register SCKC is at a high level, a clock pulse is outputted from the camera body to the photo-taking lens through the output terminal 102. The serial counter 120 is a 3-bit counter for counting the clock pulse of 1 byte (eight pulses). When the serial counter 120 has counted the clock pulse of 1 byte (eight pulses), the serial counter 120 outputs an interruption signal INT to the CPU 100.

A serial register 121 connected to the input terminal 103 temporarily stores data transferred by one bit according to the clock pulse from the photo-taking lens. The 8-bit data of the particular address of the ROM 64 stored in the serial register 121 is stored in the random access memory (hereinafter referred to as RAM) (not shown) provided in the camera body according to the interruption signal produced from the serial counter 120.

Next, the outline of the construction of the focus condition detecting device to be applied to the present invention is described hereinbelow.

Figure 3:
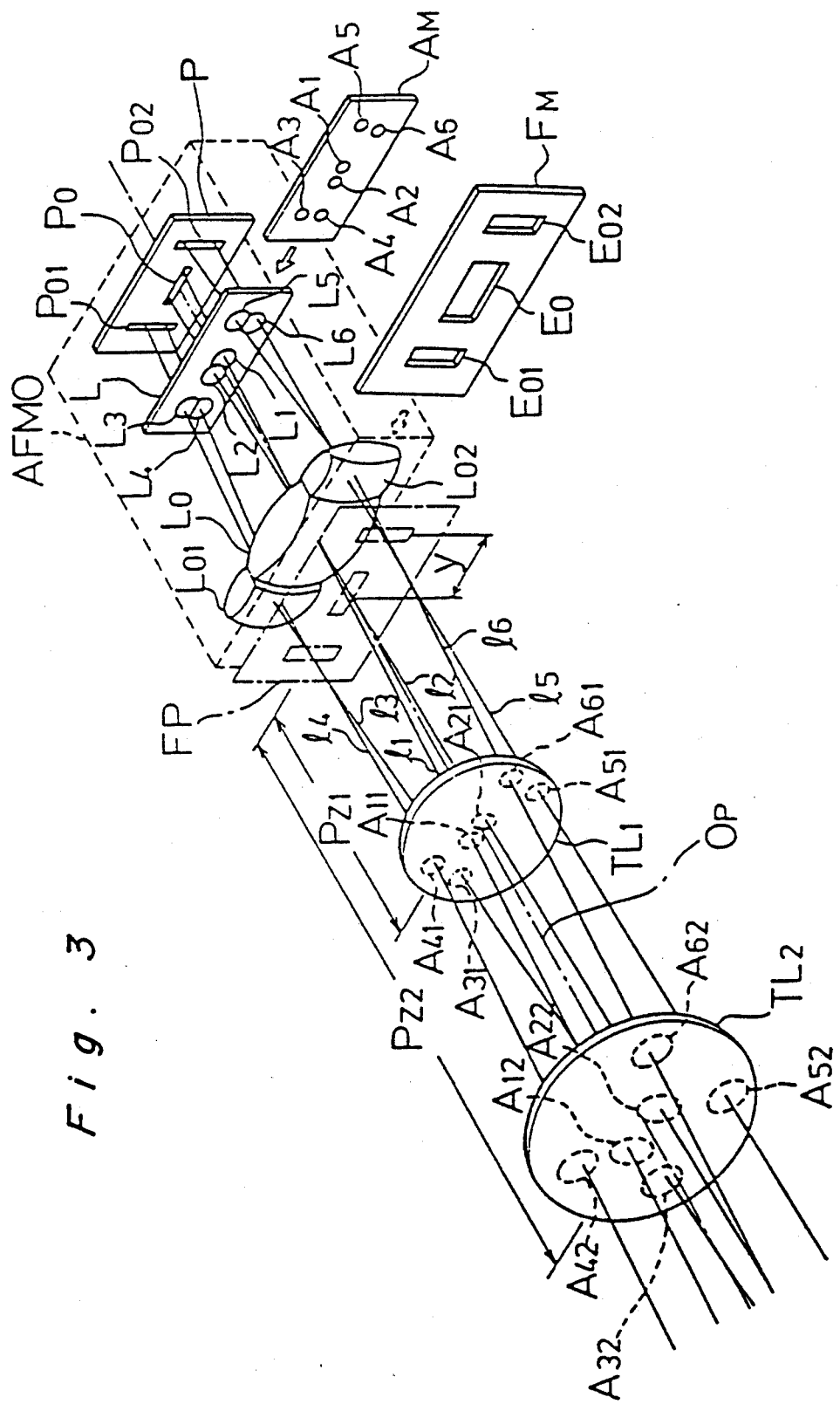
FIG. 3 is a perspective view showing the periphery of a focus detecting optical system in the system.

Referring to FIG. 3, lenses $TL_1$ and $TL_2$ constituting the photo-taking lens TL are spaced, from a focal plane FP on which an image is to be formed. A field mask FM is provided in the vicinity of the focal plane FP. The field mask FM is provided with a horizontally elongated first rectangular opening $E_0$ in the center portion thereof and vertically elongated second and third rectangular openings $E_{01}$ and $E_{02}$ on both sides of the first rectangular opening $E_0$. A light flux which has been reflected by the object and passed through the rectangular openings $E_0$, $E_{01}$, and $E_{02}$ passes through condenser lenses $L_0$, $L_{01}$, and $L_{02}$ (hereinafter referred to as a first condenser lens $L_0$, a second condenser lens $L_{01}$, a third condenser lens $L_{02}$ in correspondence with the rectangular openings $E_0$, $E_{01}$, and $E_{02}$ of the field mask FM), and then, the respective light fluxes converge.

An aperture mask AM and an image re-forming lens plate L are disposed backward of the condenser lenses $L_0$, $L_{01}$, and $L_{02}$. The image re-forming lens plate L is provided with a pair of image re-forming lenses $L_1$ and $L_2$ horizontally arranged in the center portion thereof, a pair of image re-forming lenses $L_3$ and $L_4$ and a pair of image re-forming lenses $L_5$ and $L_6$, respectively, vertically arranged on both sides of the image re-forming lenses $L_1$ and $L_2$. These image re-forming lenses $L_1$ through $L_6$ consist of flat convex lenses having the same radius of curvature (the pair of image re-forming lenses $L_1$ and $L_2$ arranged in the center portion, the pair of image re-forming lenses $L_3$ and $L_4$ and the pair of image re-forming lenses $L_5$ and $L_6$ arranged on both sides of the image re-forming lenses $L_1$ and $L_2$ are hereinafter referred to as a first pair of image re-forming lenses, a second pair of image re-forming lenses, a third pair of image re-forming lenses in correspondence with the rectangular openings $E_0$, $E_{01}$, and $E_{02}$ of the field mask FM).

The aperture mask AM is provided with aperture openings $A_1$ through $A_6$ corresponding to the positions of the image re-forming lenses $L_1$ through $L_6$. The aperture mask AM is arranged immediately forward of the image re-forming lens plate L and in close contact with the flat perfrontion of the image re-forming lens plate L.

A substrate P provided with three CCD line sensors $P_0$, $P_{01}$, and $P_{02}$ is arranged backward of the image reforming lens plate L. The CCD line sensor $P_0$ arranged in the center portion of the substrate P is horizontally elongated and the CCD line sensors $P_{01}$ and $P_{02}$ arranged on both sides of the CCD line sensor $P_0$ are vertically elongated so that the arrangement directions of the respective pair of the image re-forming lenses provided on the image reforming lens plate L correspond to the arrangement directions of the CCD line sensors $P_0$, $P_{01}$, and $P_{02}$. The CCD line sensors $P_0$, $P_{01}$, and $P_{02}$ are provided with first and second light receiving elements arranged in a row, respectively. The light receiving elements separately photoelectrically convert two images re-formed on the CCD line sensors by the pair of the image re-forming lenses (the CCD line sensors $P_0$, $P_{01}$, and $P_{02}$ are hereinafter referred to as a first CCD line sensor $P_0$, a second CCD line sensor $P_{01}$, and a third CCD line sensor $P_{02}$ in correspondence to the rectangular openings $E_0$, $E_{01}$, and $E_{02}$ of the field mask FM).

The members in a block AFMO enclosed by dotted lines in FIG. 3 is held together as a unit, thus constituting an AF sensor module. A focus detecting optical system is composed by the field mask FM, the condenser lenses $L_0$, $L_{01}$, and $L_{02}$, the aperture mask AM, and the image re-forming lens plate L.

The focus detecting device detects a focal point as follows using an image obtained by the focus detecting optical system having the above-described construction.

A light flux out of the optical axis $O_p$ for detecting a focus condition (hereinafter referred to as off-axial focus detection light flux), including principal rays $l_3$ and $l_4$ reflected by the object which is located on the area out of the optical axis $O_p$ of the photo-taking lens TL, are incident on the field mask FM such that the off-axial focus detection light flux are distant from the optical axis $O_p$ at a predetermined angle, pass through the second rectangular opening $E_{01}$, and are incident on the second condenser lens $L_{01}$. The off-axial focus detection light flux is bent toward the optical axis $O_p$ and converged by the second condenser lens $L_{01}$ and incident on the second pair of image re-forming lenses $L_3$ and $L_4$ of the image re-forming lens plate L through the second aperture openings $A_3$ and $A_4$ of the aperture mask AM. The off-axial focus detection light flux which is incident on the second pair of image re-forming lenses $L_3$ and $L_4$ is converged on the second CCD line sensor $P_{01}$ by the second pair of image re-forming lenses $L_3$ and $L_4$. As a result, a pair of images is vertically re-formed on the second line sensor $P_{01}$.

Similarly, an off-axial focus detection light flux including the principal rays $l_5$ and $l_6$ are incident on the field mask FM such that it becomes distant from the optical axis $O_p$ at a predetermined angle and is converged on the third CCD line sensor $P_{02}$ through the third rectangular opening $E_{02}$, the third condenser lens $L_{02}$, the third aperture openings $A_5$ and $A_6$ of the aperture mask AM, and the third pair of the image re-forming lenses $L_5$ and $L_6$, with the result that a pair of images are vertically re-formed on the third CCD line sensor $P_{02}$.

A bundle of rays on the optical axis for detecting a focus condition (hereinafter referred to as axial focus detection light flux), including the principal rays $l_1$ and $l_2$ which are reflected by the object which is disposed in the area including the optical axis $O_p$ of the photo-taking lens TL, is converged on the first CCD line sensor $P_0$ through the first rectangular opening $E_0$ on the optical axis $O_p$ of the field mask FM, the first condenser lens $L_0$, the first aperture openings $A_1$ and $A_2$ on the optical axis $O_p$ of the aperture mask AM, and the first pair of the image re-forming lenses $L_1$ and $L_2$, with the result that a pair of images is laterally re-formed on the first CCD line sensor $P_0$.

A focal point of the photo-taking lens TL which is focused on the object can be detected by obtaining the positions of three pairs of images re-formed on the CCD line sensors $P_0$, $P_{01}$, and $P_{02}$.

Referring to FIG. 4 in which the field in the finder is shown, the first CCD line sensor $P_0$, the second CCD line sensor $P_{01}$, the third CCD line sensor $P_{02}$ correspond to the axial focus detection area FA, the off-axial focus detection area $FA_1$ disposed on the right, and the off-axial focus detection area $FA_2$ disposed on the left, respectively. It is possible to detect the focus condition of objects disposed in the three focus detection areas FA, $FA_1$, and $FA_2$ (hereinafter referred to as a first island FA, a second island $FA_1$, and a third island $FA_2$ when these three areas are necessary to be distinguished from each other).

The focus detecting circuit of the automatic focus adjusting circuit 330 performs a focus detection using the signals outputted from the CCD line sensors $P_0$, $P_{01}$, and $P_{02}$. The control circuit for driving the lens drives the photo-taking lens TL toward an in-focus position based on the result detected by the focus detecting circuit.

Referring to FIG. 3, six areas $A_{11}$, $A_{21}$, $A_{31}$, $A_{41}$, $A_{51}$, and $A_{61}$ shown by broken lines on the photo-taking lens $TL_1$ and six areas $A_{12}$, $A_{22}$, $A_{32}$, $A_{42}$, $A_{52}$, and $A_{62}$ shown by broken lines on the photo-taking lens $TL_2$ are images (hereinafter referred to as projected image) of the aperture openings $A_1$, $A_2$, $A_3$, $A_4$, $A_5$, and $A_6$ of the aperture mask AM on the photo-taking lenses $TL_1$ and $TL_2$ projected through the three condenser lenses $L_0$, $L_{01}$, and $L_{02}$. The areas $A_{11}$, $A_{21}$, $A_{31}$, $A_{41}$, $A_{51}$, and $A_{61}$ and $A_{12}$, $A_{22}$, $A_{32}$, $A_{42}$, $A_{52}$, and $A_{62}$ indicate the areas in which the focus detection light fluxes, which pass through the six apertures $A_1$, $A_2$, $A_3$, $A_4$, $A_5$, and $A_6$, pass the two photo-taking lenses $TL_1$ and $TL_2$. Accordingly, if the six projected images $A_{11}$, $A_{21}$, $A_{31}$, $A_{41}$, $A_{51}$, and $A_{61}$ on the photo-taking lens $TL_1$ and the six projected images $A_{12}$, $A_{22}$, $A_{32}$, $A_{42}$, $A_{52}$, and $A_{62}$ on the photo-taking lens $TL_2$ are included in the pupils of the photo-taking lenses $TL_1$ and $TL_2$, the focus detection light fluxes which are incident on the three CCD line sensors $P_0$, $P_{01}$, and $P_{02}$ are not vignetted in the photo-taking lenses $TL_1$ and $TL_2$. Thus, the object can be brought into focus with a high accuracy based on the focus condition detection using the outputs of the three CCD line sensors $P_0$, $P_{01}$, and $P_{02}$.

Figure 5:
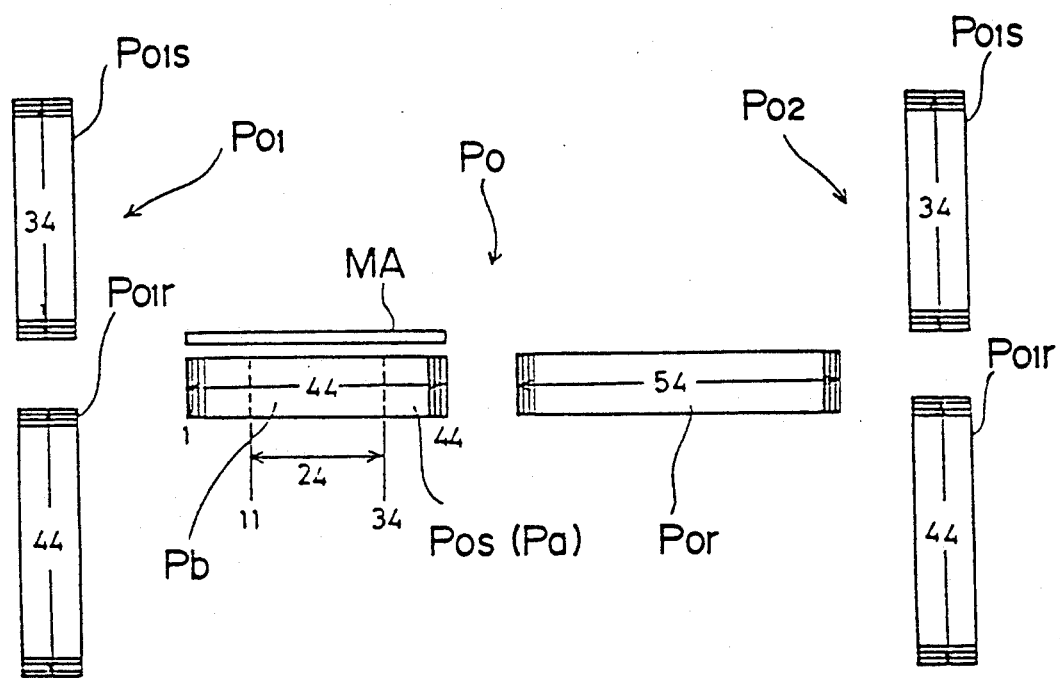
FIG. 5 is an enlarged front view of a light receiving unit of a CCD line sensor in the system.

FIG. 5 shows in detail the light receiving unit of the CCD line sensor (CCD line sensor includes a light receiving unit, a charge accumulating unit (not shown), and a transfer unit (not shown)) to be used in the focus detecting device. The line sensor $P_0$ is provided with a standard portion $P_{0s}$ and a reference portion $P_{0r}$. The line sensor $P_{01}$ is provided with a standard portion $P_{01s}$ and a reference portion $P_{01r}$. The line sensor $P_{02}$ is provided with a standard portion $P_{02s}$ and a reference portion $P_{02r}$. There is provided a monitoring light receiving element MA for controlling an integration period for the accumulating unit of the CCD line sensor on one side of the standard portion $P_{0s}$ of the line sensor $P_0$. The number of picture elements of the standard portions $P_{0s}$, $P_{01s}$, and $P_{02s}$ and the reference portions $P_{0r}$, $P_{01r}$, and $P_{02r}$ of the line sensors $P_0$, $P_{01}$, and $P_{02}$ is 44, 52 in the line sensor $P_0$ and 34, 44 in the line sensors $P_{01}$, and $P_{02}$. The CCD line sensors $P_0$, $P_{01}$, and $P_{02}$ are formed on one chip.

In the focus detecting device according to this embodiment, the standard portion $P_{0s}$ of the line sensor $P_0$ is divided into a plurality of blocks and each of the divided blocks of the standard portion $P_{0s}$ is compared with the entire reference portion $P_{0r}$ so as to detect a focus condition. The line sensor $P_0$ is provided with an entire block Pa which uses the picture elements in the entire area thereof and a partial block Pb which uses only the picture elements disposed in the center thereof. Specifically, 44 picture elements are used in the entire block Pa and 24 picture elements disposed in the center thereof are used in the partial block Pb.

In detecting a focus condition, the following three focus adjusting modes are available. According to a first mode, one of the three islands FA, $FA_1$, and $FA_2$ is selected and a focus condition is adjusted based on a defocus amount obtained from the selected island (this mode is hereinafter referred to as multipoint focus detection mode). According to a second mode, only the first island FA is used and a focusing condition is adjusted based on the defocus amount obtained from the entire block Fa (this mode is hereinafter referred to as wide focus detection mode). According to a third mode, only the partial block Fb of the first island FA is used to adjust a focus condition based on the defocus amount obtained from the partial block Fb (this mode is hereinafter referred to as spot focus detection mode). These mode can be switched to each other.

FIGS. 6-(a) through (d) show the images $A_{12}$, $A_{22}$, $A_{32}$, $A_{42}$, $A_{52}$, and $A_{62}$ of the six aperture openings $A_1$, $A_2$, $A_3$, $A_4$, $A_5$, and $A_6$ of the aperture mask AM on the exit pupil of various kinds of photo-taking lenses projected through the three condenser lenses $L_0$, $L_{01}$, and $L_{02}$.

FIG. 6-(a) shows a projected image on the exit pupil when a photo-taking lens $TL_a$ whose pupil is great is used. Since the pupil is great, all of the projected images $A_{12}$, $A_{22}$, $A_{32}$, $A_{42}$, $A_{52}$, and $A_{62}$ exist on the exit pupil $TL_{ao}$ of the photo-taking lens $TL_a$ and all of light fluxes, adapted for detecting a focus condition, which are incident on the CCD line sensors $P_0$, $P_{01}$, and $P_{02}$ are not vignetted by the pupil of the photo-taking lens $TL_a$, and as such, can be used for detecting a focus condition. That is, since the focus condition can be detected in all of the focus detection areas FA, $FA_1$, and $FA_2$, the multipoint focus detection mode is selected.

Figure 6A:
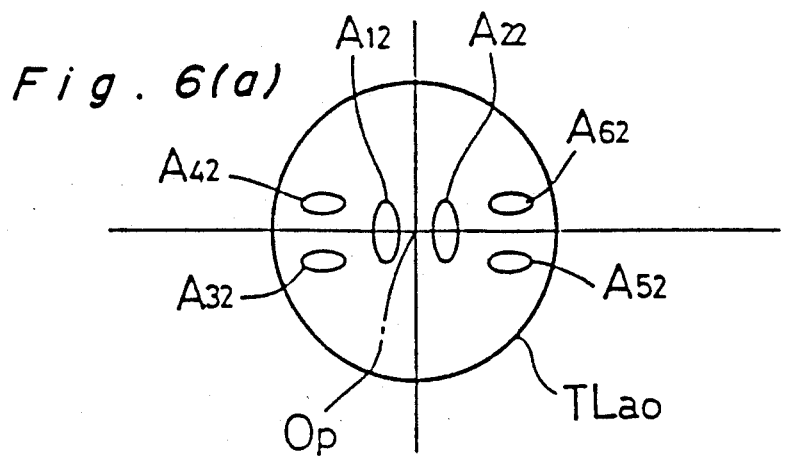
FIG. 6-($a$) through 6-($d$) are schematic diagram showing the relationship between the exit pupil of a phototaking lens and the entrance pupil of the focus detecting optical system.
Figure 6B:
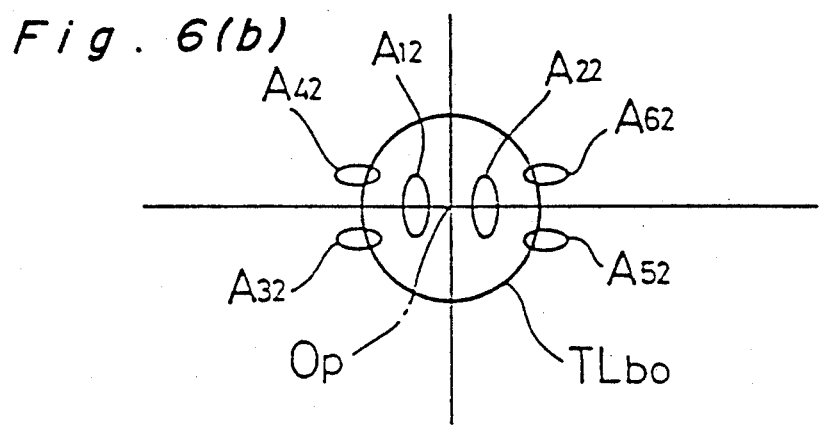
Figure 6C:
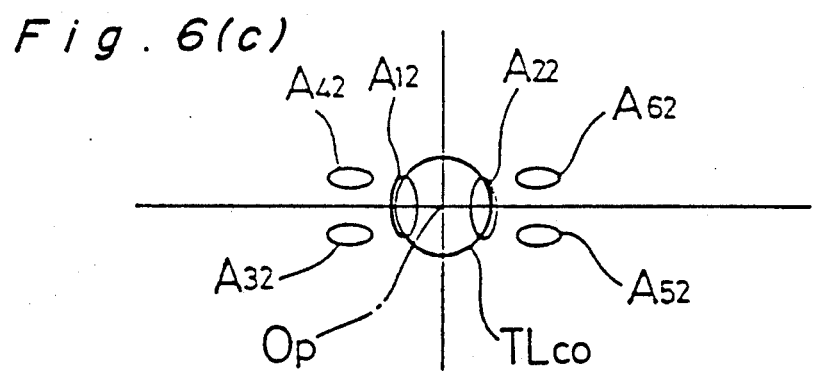
Figure 6D:
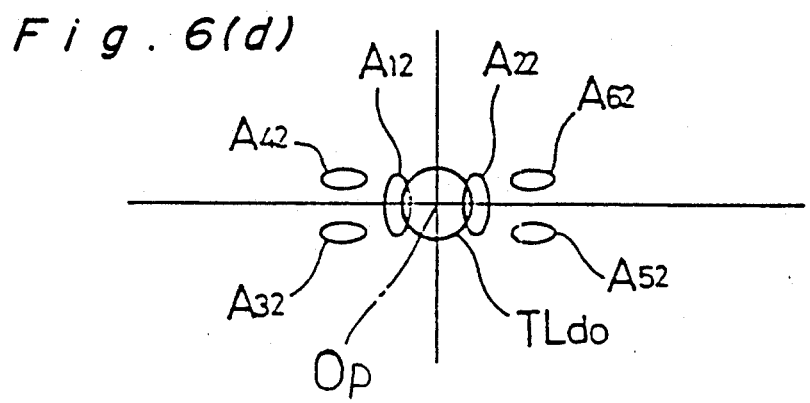

FIGS. 6(b) through (d) show projected images on the exit pupil when photo-taking lenses whose pupils are smaller than the pupil of the photo-taking lens shown in FIG. 6-(a) are used.

In the photo-taking lens $TL_b$ shown in FIG. 6-(b) since the pupil $TL_{b0}$ thereof is small, a light flux which is capable of being incident on the CCD line sensor without being vignetted by the pupil of the photo-taking lens $TL_b$ is only an axial focus detection light flux. Therefore, the island which is capable of detecting a focus condition is only the first island FA disposed in the center of the field in the finder shown in FIG. 5. Accordingly, in this case, the wide focus detection mode which detects a focus condition using the entire block Fa of the first island FA is selected.

In the photo-taking lens $TL_c$ shown in FIG. 6-(c), since the pupil $TL_{c0}$ thereof is smaller than the pupil $TL_{b0}$ of the photo-taking lens $TL_b$ shown in FIG. 6-(b), the light flux which is incident on the first island FA, namely, the axial focus detection light flux is vignetted. But the portion which is vignetted is part of the outer portion of the first island FA. Accordingly, in this case, the spot focus detection mode in which a focus condition is detected by using the partial block Fb of the first island FA is selected.

In the photo-taking lens $TL_d$ shown in FIG. 6-(d), since the pupil $TL_{d0}$ thereof is smaller than the pupil $TL_{c0}$ of the photo-taking lens $TL_c$ shown in FIG. 6-(c), most of the focus detection light fluxes which are incident on the first island FA is vignetted, so that a focus condition cannot be detected. Accordingly, a focus condition is not detected.

On receipt of lens data transferred from the circuit 6 in the photo-taking lens, the CPU 100 detects which of the focus detection light fluxes shown in FIGS. 6-(a) through 6-(d) corresponds to the size of the exit pupil $TL_0$ of the photo-taking lens TL based on the AF aperture value $AFAV_0$ which is related to the size of the exit pupil $TL_0$ for detecting a focus condition. Based on the detected result, the CPU 100 selects either of the focus detection modes so as to detect a focus condition.

Accordingly, with respect to various kinds of photo-taking lenses, if the $AFAV_0$ thereof is great, a focus condition can be detected with a high accuracy by using a wide focus detection area Fa and even if the $AFAV_0$ is small, a focus condition can also be detected by using a narrow focus detection area Fb. Thus, without reducing the kind of the photo-taking lens capable of detecting a focus condition, a focus condition can be detected with a high accuracy.

FIG. 1 shows the outline of the above-described construction. Based on the result decided by a deciding means DM by using the lens data transferred from the ROM 64 which stores lens information, a control means CM switches the focus detection mode in a focus detecting means FD. The focus detecting means FD, the deciding means DM, and the control means CM are provided in the CPU 100.

The exit pupil $TL_0$ of the photo-taking lens TL also becomes small when the converter lens is mounted between the camera body and the photo-taking lens. When the converter lens is mounted, the fully open aperture value of the lens in combination of the photo-taking lens with the converter lens is changed with the change of the focal length made by the converter lens. The conversion circuit 555 of the circuit 5 in the converter lens converts the focal length, the fully open aperture value, and the $AFAV_0$ of the lens data inputted from the circuit 6 provided in the photo-taking lens, thus outputting the converted values to the CPU 100. As described above, the CPU 100 selects either of the focus detection modes using the $AFAV_0$.

In the state in which the converter lens is mounted, the position of the exit pupil is likely to change in the direction along the optical axis $O_p$ and because of this, the size of the exit pupil $TL_0$ may change at a ratio different from the conversion ratio corresponding to the $AFAV_0$ converted by the conversion circuit 555. As a result, despite that a focus condition can be detected in a wider range, a focus detection mode in which a narrow focus detection area may be used is selected.

In order to overcome this problem, an off-axial focus detection admitting signal WB, which is data indicative of an admitting degree with respect to a position of an exit pupil of the photo-taking lens, is stored in the lens ROM 64 of the circuit 6 in the photo-taking lens. The admitting signal WB is also transferred to the CPU 100 when lens data is transferred thereto. Further, based on the admitting signal WB, the CPU 100 is so constructed that a standard value to be compared with the $AFAV_0$ for selecting a focus detection mode is made to be great so that a focus condition can be detected by a lens formed by combining a photo-taking lens and a converter lens, which makes the $AFAV_0$ so great that it is impossible to detect a focus condition according to the known method. In addition, the CPU 100 is so constructed that a focus condition can be detected with high accuracy by lenses other than the above-described lens because a focus detection area is greater than that conventionally adopted.

That is, the ROM 64, which is the means for storing lens information, of the circuit 6 in the photo-taking lens also serves as a means for storing as the admitting signal WB the degree of the influence in the vignetting in a light flux which is incident on a focus detecting system AO, caused by the mounting of the converter lens on the photo-taking lens. The CPU 100 controls the operation of the focus detection means FD based on the information stored in the ROM 64, namely, the admitting signal WB.

The operation of the CPU 100 of the circuit 1 in the camera body is described hereinbelow with reference to the flowcharts shown in FIGS. 7 through 11.

Figure 7:
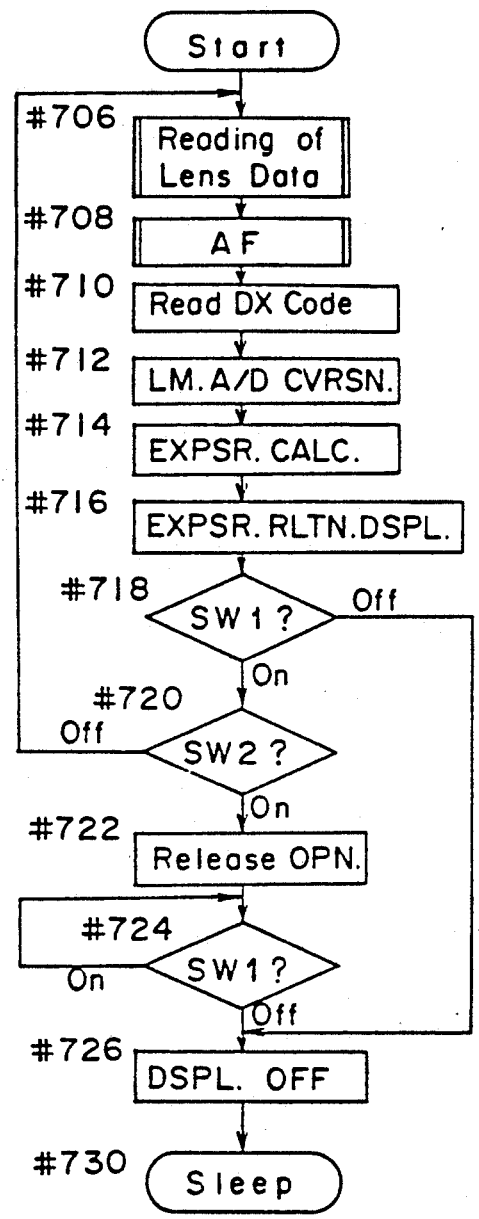
FIG. 7 through FIG. 11 are flowcharts showing the operation of the camera system.

FIG. 7 is a flowchart showing the main routine of the operation program of the CPU 100.

The operation of this main routine is started by the ON of the light measuring switch SW1 caused by depressing the release button through the first half of its full stroke.

First, at step #706, a subroutine (reading of lens data) for reading the lens data from the circuit 6 in the photo-taking lens is called. In this subroutine (reading of lens data), as described later, the following operations are performed: The read of the ROM data, the detection as to whether or not the photo-taking lens is mounted on the camera body, the decision as to whether or not an automatic focus adjusting operation is possible, and the decision of a focus detection mode due to the selection of a focus detection area to be used.

Next, at step #708, the subroutine AF for performing the automatic focus adjusting is called. In this subroutine AF, as described later, the photo-taking lens is driven to obtain an in-focus state.

At step #710, the film sensitivity data SV of a film patrone put in the patrone chamber of the camera body is read from the film sensitivity information circuit 360 into the CPU 100. At step #712, the light measuring circuit 310 measures the luminance of the object and makes the A/D conversion of the luminous data obtained by the measuring, thus obtaining the data $BV_0$ of the luminance value. Thereafter, at step #714, an exposure calculation is performed according to the known method using lens data, namely, the fully open aperture value $AV_0$ of the lens data, the minimum aperture value AVmax, the variation amount data $\Delta AV$ of the aperture value due to a zooming, the data of a focal length f, film sensitivity data SV, and the luminance value data $BV_0$. At step #716, the value obtained by this exposure calculation is transferred to the display circuit 340 so that the value is indicated thereby.

Next, at step #718, it is detected whether or not the light measuring switch SW1 remains ON. If it is decided that the light measuring switch SW1 is OFF, the program goes to step #726 at which all the displays made by the display circuit 340 are cleared, then the CPU 100 stops its operation at step #730.

If, on the other hand, it is detected that the light measuring switch SW1 remains ON at step #718, it is detected at step #720 whether or not the release switch SW2 is OFF. If the release switch SW2 is ON, the known release operation is performed at step #722. After the release operation is completed, the state in which the light measuring switch SW1 is turned OFF is waited at step #724, then the program goes to step #726. If it is detected at step #720 that the release switch SW2 is OFF, the program returns to step #706 to repeat the operation of reading the lens data and the subsequent operations.

Figure 8:
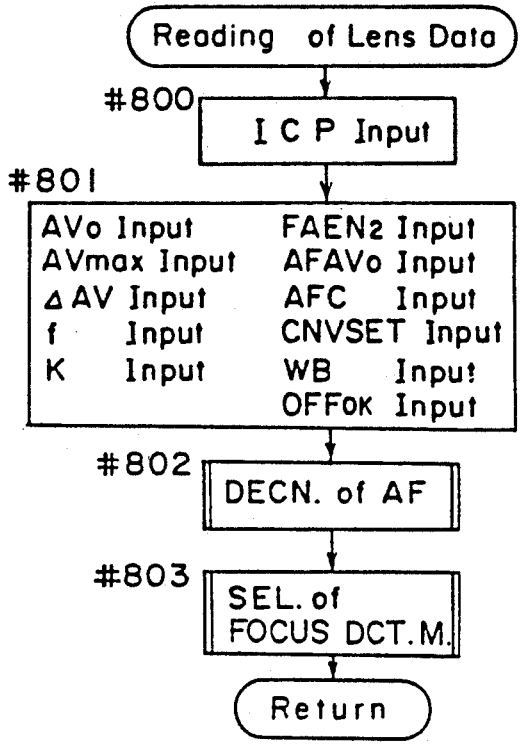

FIG. 8 is a flowchart of the subroutine (reading of lens data) to be called in the main routine (step #706).

When this subroutine is called, first, at step #800, a lens mounting signal ICP indicating that the photo-taking lens has been mounted is inputted. Only when the photo-taking lens is mounted on the camera body, the lens mounting signal ICP is outputted from the circuit 6 in the photo-taking lens, i.e., if the photo-taking lens has not been mounted on the camera body, the lens mounting signal ICP is not inputted. The lens mounting signal ICP allows the detection as to whether or not the photo-taking lens has been mounted on the camera body.

At step #801, various lens data are inputted. The data to be inputted are as follows: An axial focus detection signal $FAEN_2$ to be used to detect whether or not an axial focus detection is possible due to the vignetting of a focus detecting light flux in the vicinity of the optical axis, for example in a reflecting telephoto lens the axial focus detection is impossible; AF aperture value $AFAV_0$ to be used to decide whether or not a focus detection light flux is vignetted by the exit pupil of a photo-taking lens; an AF lens deciding signal AFC to be used to decide whether or not a lens drive mechanism for an automatic focus adjusting is mounted on a photo-taking lens; a converter lens mounting signal CNVSET to be used to decide whether or not a converter lens is mounted on the photo-taking lens; an off-axial focus detection admitting signal WB for switching a decision level according to the position of the exit pupil along the optical axis $O_p$ in deciding which of a plurality of focus detection areas is possible for detecting a focus condition according to the $AFAV_0$; an off-axial focus detection signal $OFF_{ok}$ for deciding whether or not a focus condition can be detected in off-axial focus detection areas; a coefficient K for finding the drive amount of a photo-taking lens according to a defocus amount determined by a focus detection calculation; data $AV_0$ of a fully open aperture value to be used to the calculation of a light measuring; data of a minimum aperture value AVmax; variation amount data $\Delta AV$ of aperture value caused by a zooming; and a focal length data f.

Thereafter, at step #802, the subroutine (decision as to whether or not AF is possible), for deciding whether or not an automatic focusing adjustment is possible using these five lens data ($FAEN_2$, $AFAV_0$, AFC, WB, $OFF_{ok}$), is called. At step #803, the subroutine (selection of focus detection mode), for determining a focus detection area which can be used, is called. Thereafter, the program returns to the main routine.

Figure 9:
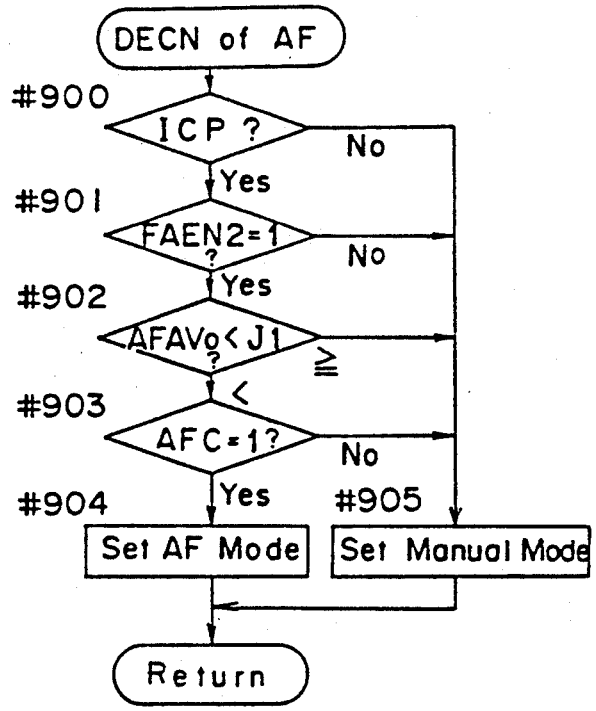

FIG. 9 is a flowchart of the subroutine (decision as to whether or not AF is possible) to be called at step #802 of the subroutine (reading of lens data).

In this subroutine, the CPU 100 goes into an automatic focus adjusting mode (hereinafter referred to as AF mode) only when the conditions of step #900 through step #903 are all satisfied. At step #900, it is detected whether or not the lens mounting signal ICP is outputted from the circuit 6 in the photo-taking lens. At step #901, it is detected whether or not a photo-taking lens allows a focus condition detection using an axial focus detecting light flux ($FAEN_2=1$). At step #902, it is detected whether or not a photo-taking lens has an $AFAV_0$ which is smaller than a predetermined value J1 and that a focus detecting light flux is not vignetted. At step #903, it is detected whether or not a photo-taking lens is provided with a lens drive mechanism for an automatic focus adjustment (AFC=1).

If the above conditions are all satisfied, AF mode is set at step #904. If all of the above conditions are not satisfied, a manual focusing mode is set at step #905, then the program returns.

Figure 10:
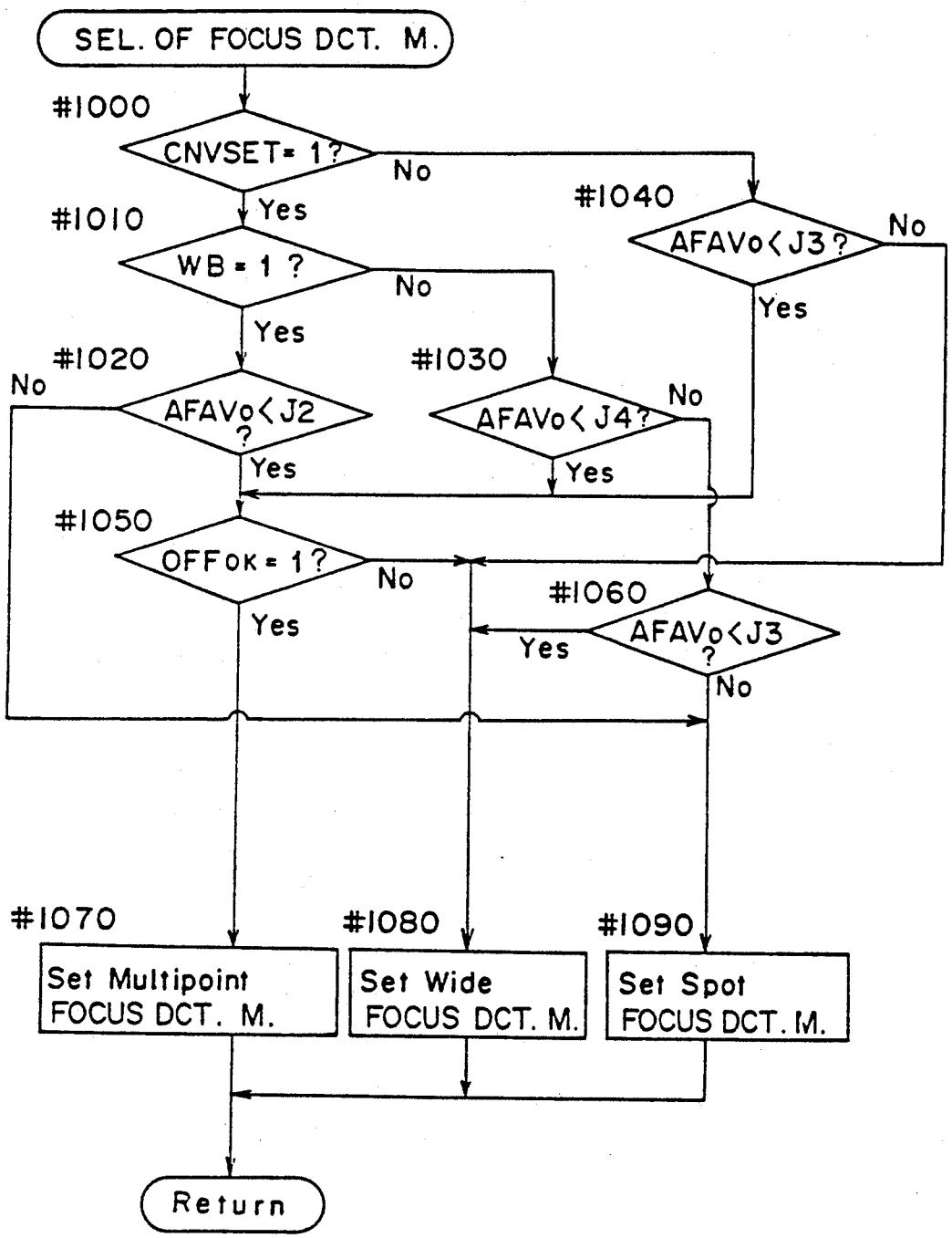

FIG. 10 is a flowchart of the subroutine (selection of focus detection mode) to be called at step #803 of the subroutine (reading of lens data). The decision of the focus detection area according to this subroutine is shown in FIG. 12.

In this subroutine, if it is detected that the converter lens is not mounted (CNVSET≠1) at step #1000, the program goes to step #1040. If the $AFAV_0$ is smaller than a predetermined value J3 at the step #1040, the program goes to step #1050. If it is decided that off-axial focus detection areas can be used ($OFF_{ok}=1$) at step #1050, the multipoint focus detection mode in which three islands FA, $FA_1$, and $FA_2$ are used is set at step #1070.

If the $AFAV_0$ is greater than the predetermined value J3 at step #1040, the wide focus detection mode in which the entire block Fa of the first island FA is used is set at step #1080. If the $AFAV_0$ is greater than the predetermined value J1, it is impossible to detect a focus condition, so that the manual mode is set. This is shown by the subroutine (decision as to whether or not AF is possible) at step #902 shown in FIG. 9.

Next, if it is detected at step #1000 that the converter lens is mounted (CNVSET=1), it is detected at step #1010 whether or not the off-axial focus admitting signal WB is 1.

If no (WB≠1), it is detected at step #1030 whether or not the $AFAV_0$ is greater than the predetermined value J4. If the $AFAV_0$ is smaller than the predetermined value J4, it is detected at step #1050 whether or not a focus condition can be detected using an off-axial focus detection light flux. If the focus condition can be detected using the off-axial focus detection light flux ($OFF_{ok}=1$), the multipoint focus detection mode is set at step #1070. If no, ($OFF_{ok}=1$), the wide focus detection mode is set at step #1080. If it is decided at step #1030 that the $AFAV_0$ is greater than the predetermined value J4, it is detected at step #1060 whether or not the $AFAV_0$ is greater than the predetermined value J3. If the $AFAV_0$ is smaller than the predetermined value J3, the wide focus detection mode is set at step #1080. If it is decided at step #1060 that the $AFAV_0$ is greater than the predetermined value J3, the spot focus detection mode in which the partial block Fb disposed in the center of the first island FA is used is set at step #1090.

If it is detected that the off-axial focus admitting signal WB is 1 at step #1010, the $AFAV_0$ is compared with the predetermined value J2 at step #1020. If the $AFAV_0$ is smaller than the predetermined value J2, the program goes to step #1050. If it is detected at step #1020 that the $AFAV_0$ is greater than the predetermined value J2, the spot focus detection mode is set at step #1090.

Either of the three focus detection modes is set at steps #1070, #1080, and #1090, then the program returns.

Figure 11:
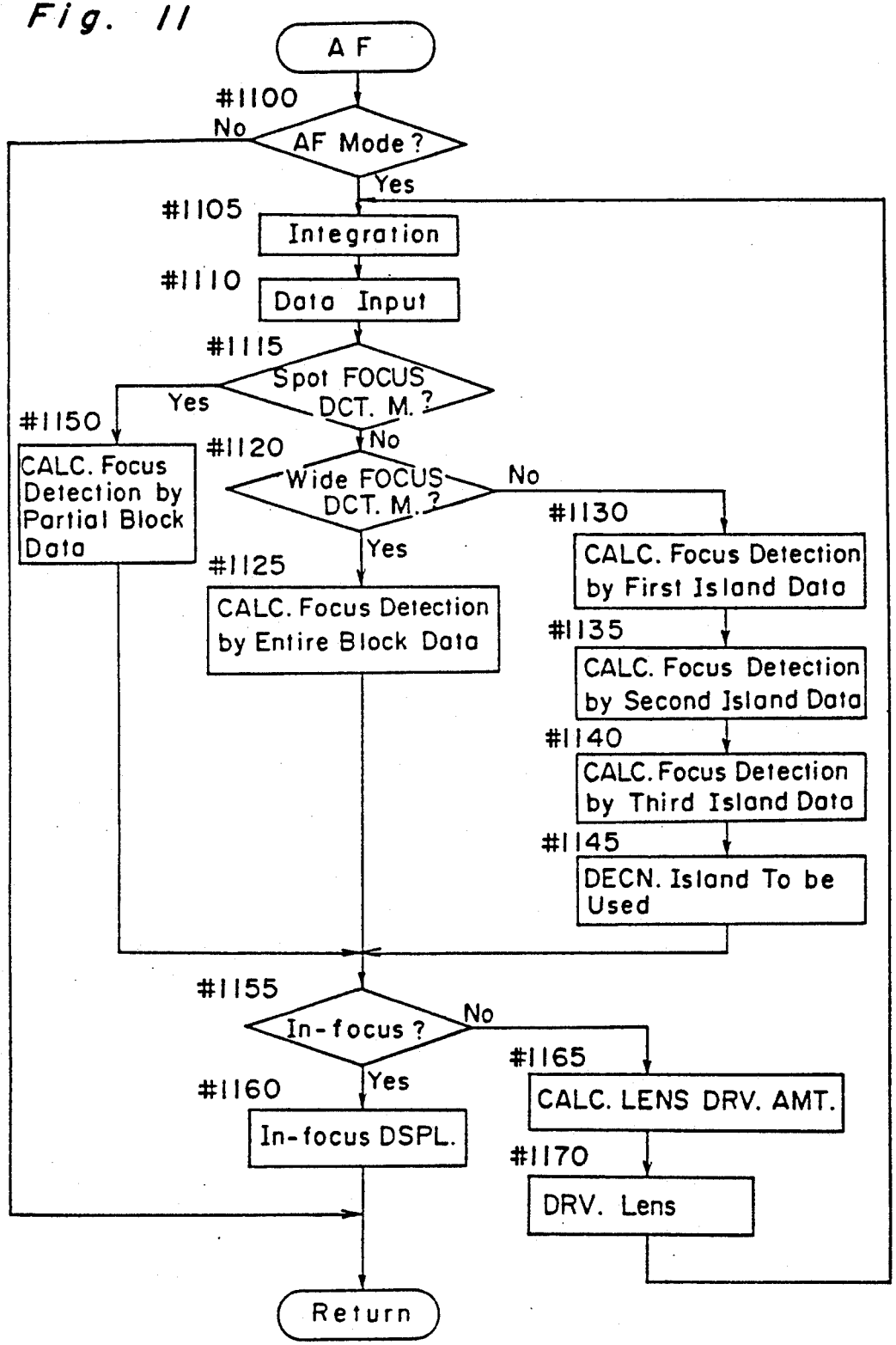

FIG. 11 is the subroutine of the subroutine AF to be called at step #708 of the main routine.

When this subroutine is called, first, it is detected at step #1100 whether or not the AF mode is selected. If it is decided that the AF mode is not selected, the program returns to the main routine without performing an operation. If the AF mode is selected,, an integration is performed on CCD at step #1105 and the resultant of the integration is inputted to the CPU 100 at step #1110, and the focus detection mode is detected at steps #1115 and #1120.

If it is detected that the spot focus detection mode is selected at step #1115, the focus detection calculation at the spot focus detection mode is performed based on the resultant of the integration in the partial block (Fb) of the island FA at step #1150. If it is detected that the wide focus detection mode is selected at step #1120, the focus detection calculation at the wide focus detection mode is performed based on the resultant of the integration in the entire block (Fa) of the island FA at step #1125. If it is detected that neither the spot focus detection nor the wide focus detection is selected at steps #1115 and #1120, it means that the multipoint focus detection mode is selected. Accordingly, the calculation of a focus condition detection is performed in each of the islands FA, $FA_1$, and $FA_2$ at steps #1130 through #1140, then, the calculation in which an island is selected from the three islands is performed at step #1145.

The method for determining the island is based on the algorithm that, of the three islands, an island including an object nearest the camera is selected.

After the calculation for each of the focus detection modes at step #1155, it is detected whether or not the calculated focus condition is an in-focus condition. If the condition is the in-focus condition, the display shown the in-focus condition is displayed on the display circuit 340 at step #1160, then the program returns to the main routine. If the calculated condition is not an in-focus condition, the lens drive amount is calculated at step #1165 using the coefficient K transmitted from the circuit 6 in the photo-taking lens and the defocus amount calculated by the focus detection calculation, then, the lens is driven at step #1170. Then, the program returns to step #1105 and repeats the above flow till step #1155. If it is decided that the in-focus condition is obtained at step #1155, the program goes to step #1160. If it is decided that an in-focus condition is not obtained, the lens drives are repeated.

(Other embodiments)

Next, another embodiment will be described hereinbelow.

Figure 13:
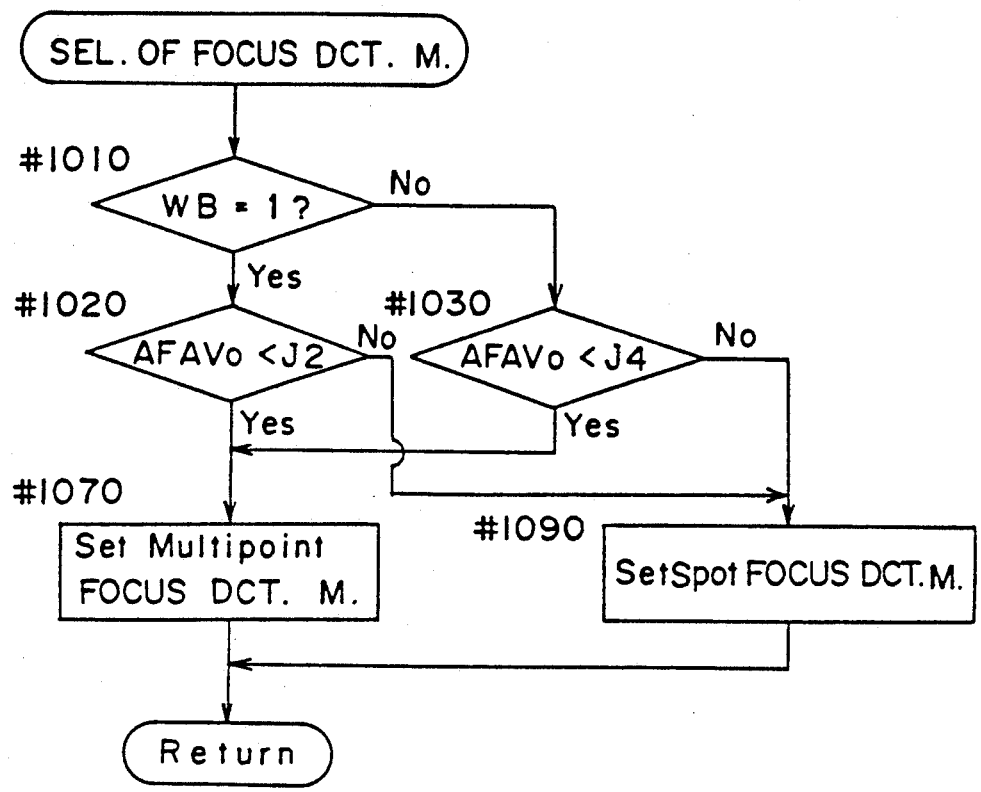
FIGS. 13 and 14 are flowcharts showing another embodiments of the operations of the camera system, respectively.
Figure 14:
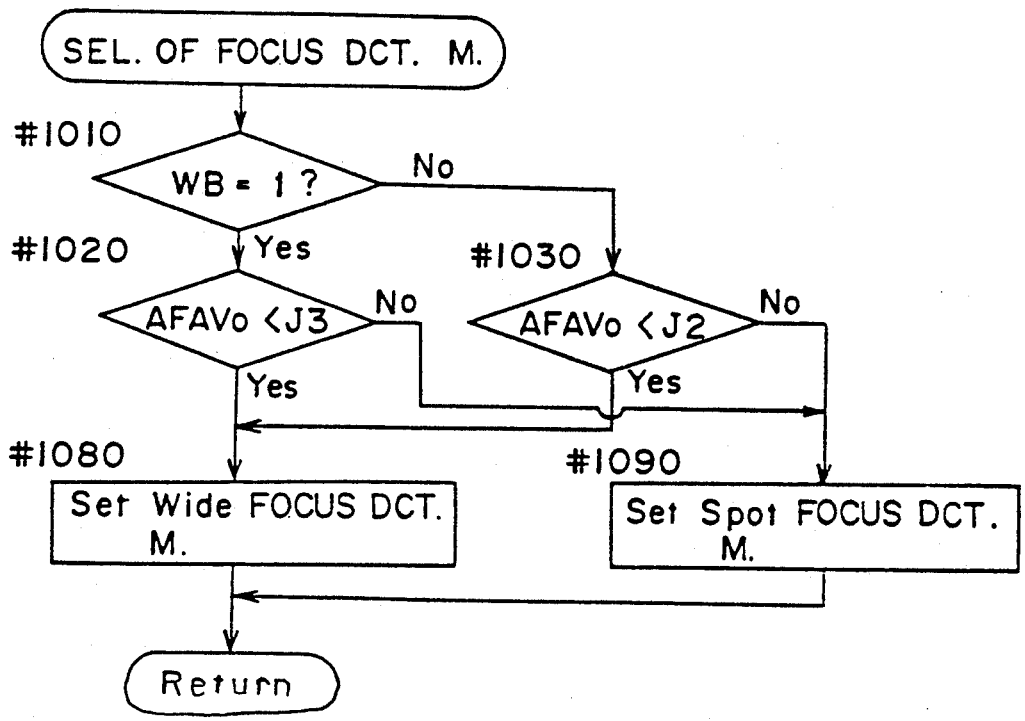

(1) The flowcharts shown in FIGS. 13 and 14 are other embodiments of the subroutine (selection of focus detection mode) of the above-described embodiment shown in FIG. 10. In these other embodiments, the number of standard values to be used for selecting a focus detection area by being compared with the $AFAV_0$ is smaller than that of the above-described embodiment and the number of the focus detection modes to be selected are two.

That is, in embodying the present invention, the focus detection mode is divided into any desired number and the standard value to be compared with the $AFAV_0$ may be appropriately modified.

(2) The construction for dividing the focus detection area may be appropriately modified and the construction used in the above-described embodiment may be replaced with a construction which radially divides the focus detection area such as a concentric or a matrix-shaped construction.

(3) In order to reduce the influence caused by a vignetting, a mechanical means such as a projection provided on the mount portion may be used to store information instead of the lens ROM 64 described in the above-described embodiment.

As described above, in the camera system according to the embodiment, the storing means stores the degree of the influence of a vignetting on a light flux for a focus condition detection due to the mounting of the converter lens on the photo-taking lens. The camera system also controls the operation of the focus detecting means based on the information, stored in the storing means, for correcting the influence of the movement of the exit pupil along the optical axis due to the mounting of the converter lens. Thus, the camera system in accordance with the embodiment is easily capable of determining whether or not a focus condition can be accurately detected in a predetermined focus condition area, which enables a focus adjusting operation by using more photo-taking lenses when a focus condition detection area consists of a single area. If a focus condition detection area is divided into plural areas, an accurate focus condition can be detected by using the greatest area which can be used. Thus, the construction of the camera system for detecting a focus condition with the converter lens mounted on the photo-taking lens allows the use of various kinds of photo-taking lens and a more accurate focus condition detection.

Figure 15:
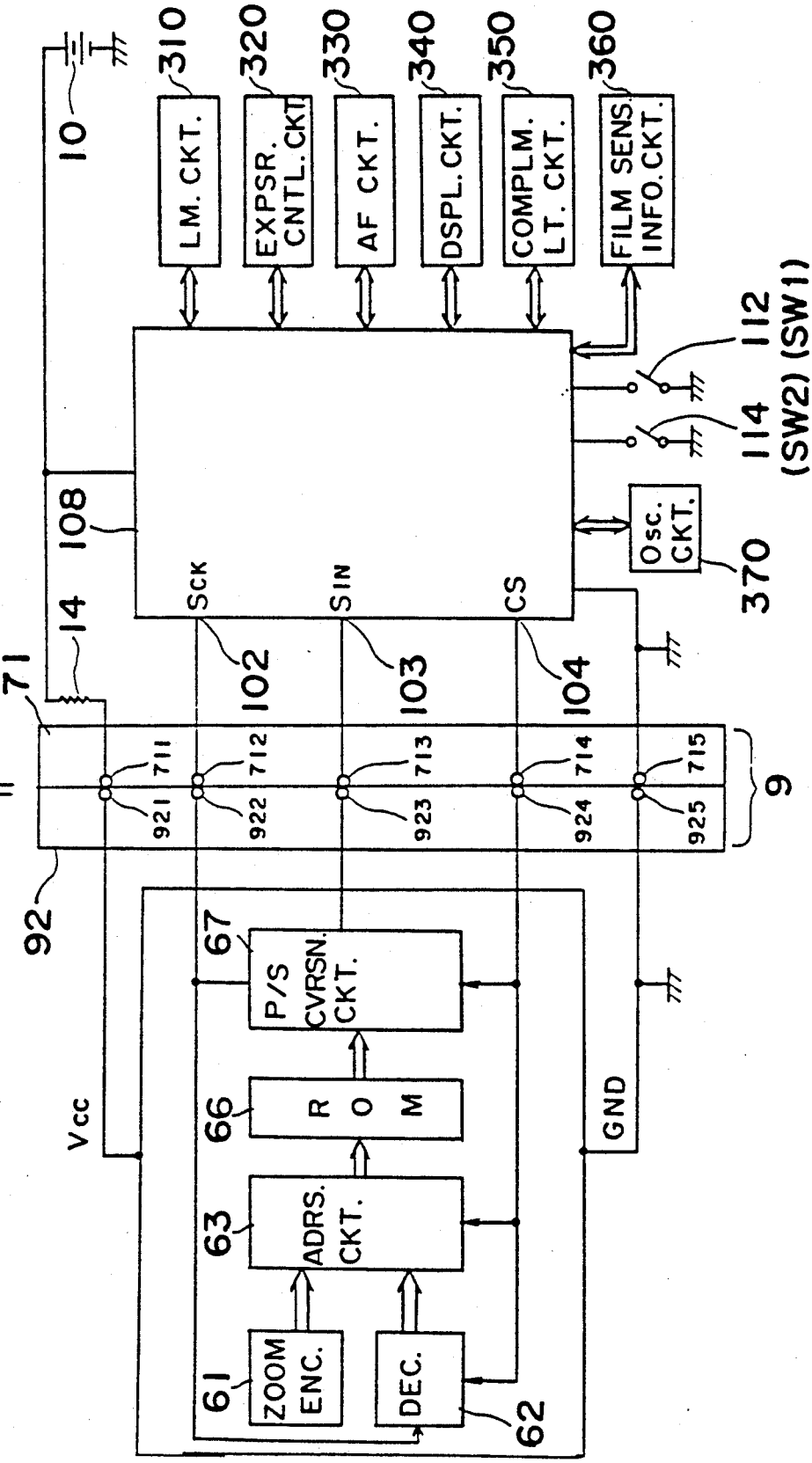
FIG. 15 is a block diagram showing an entire circuit of a camera system according to another embodiment of the present invention.
Figure 16A:
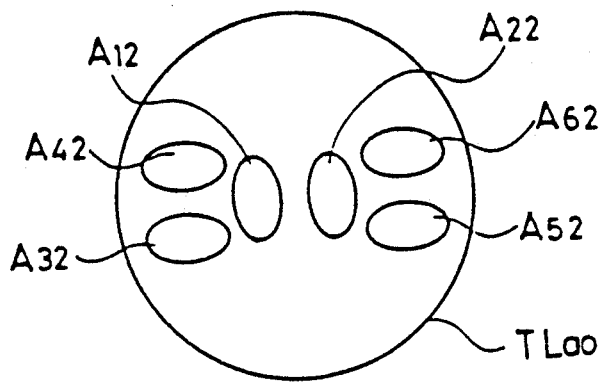
FIG. 16-($a$) through 16-($e$) are schematic diagram showing the relationship between the exit pupil of a photo-taking lens and the entrance pupil of the focus detecting optical system.
Figure 16B:
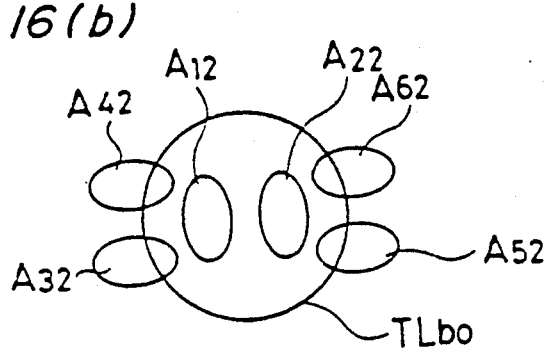
Figure 16C:
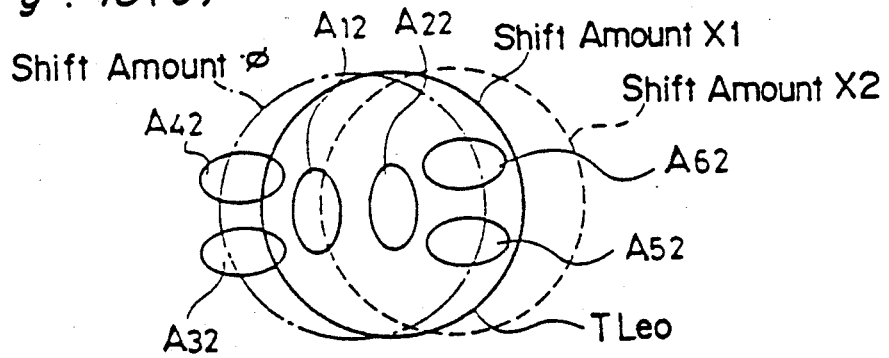
Figure 16D:
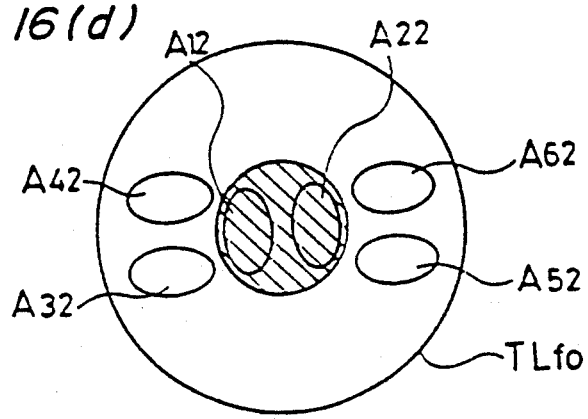
Figure 16E:
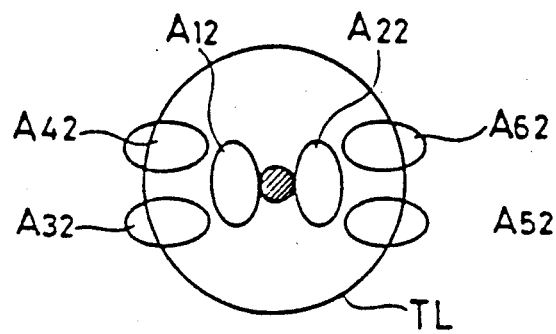

Although the axial focus detection area is divided into two blocks Fa, Fb in the above-described embodiment, it may be used as only a single area without dividing as described below. That is, in the following embodiment, the axial focus detection area is single and a zoom lens as the photo-taking lens is mounted on the camera body without the converter lens, as shown in FIG. 15. Since the most parts of this embodiment are similar to those of the above-described embodiment shown in FIG. 1, like parts are designated by like reference numerals, so that the description of those parts will be omitted.

Referring to FIG. 15 showing the circuit diagram of a camera body of a camera system in accordance with this embodiment, a circuit 1 provided in the camera body and the circuit 11 provided in the zoom lens are electrically connected to each other by a group of contacts 711 through 715 mounted on the camera body and a group of contacts 921 through 925 mounted on the zoom lens. The contacts 711 through 715 and 921 through 925 are provided on a mount portion 9. The contacts 921 through 925 correspond to the contacts 821 through 825 in FIG. 1.

The mount portions 7 and 8 are described hereinbelow. The mount portion 9 provided between the camera body and the zoom lens comprises the mount 71 provided on the camera body on which the zoom lens is mounted and a mount 92 provided on the zoom lens. The circuit connection allows a serial communication between the CPU 108 in the circuit 1 provided in the camera body and the circuit 11 provided in the zoom lens.

The zoom lens is used as a photo-taking lens. A zoom encoder 61 outputs a 3-bit coded signal $\Delta Z$ according to a zoom operation, namely, a focal length setting operation. A decoder 62 counts the clock pulse applied from the clock output terminal 102 Sck of the CPU 108 and decodes it. An address specifying circuit 63 selects the signals outputted from the encoder 61 and the decoder 62, thus specifying an address of a read only memory 66 (hereinafter referred to as ROM). The ROM 66 mounted on the photo-taking lens previously stores the individual information on the photo-taking lens in its addresses thereof. When an address of the ROM 66 is specified by the address specifying circuit 63, the information stored by the specified address is outputted in parallel from the ROM 66 to a P/S conversion circuit 67. The P/S conversion circuit 67 converts the parallel signals outputted from the ROM 66 into serial signals, thus outputting the serial signals to the input terminal 103 Sin of the CPU 108 through mount contacts 923 and 713.

A constant voltage Vcc is supplied to the circuit 11 provided in the zoom lens (hereinafter referred to as zoom lens circuit) through the mount contact 921 and the earth contact of the zoom lens circuit 11 is connected to the earth line through the mount contact 925.

FIG. 16 shows images $A_{12}$, $A_{22}$, $A_{32}$, $A_{42}$, $A_{52}$, and $A_{62}$ of the aperture openings $A_1$, $A_2$, $A_3$, $A_4$, $A_5$, and $A_6$ of the aperture mask AM on the exit pupil of various kinds of exchangeable lenses projected through the condenser lens.

FIG. 16-(a) shows the case in which a photo-taking lens $TL_a$ has a great pupil. Since the pupil $TL_{a0}$ thereof is great, all of the projected images $A_{12}$, $A_{22}$, $A_{32}$, $A_{42}$, $A_{52}$, and $A_{62}$ exist on the exit pupil $TL_{a0}$ of the photo-taking lens TL. And all light fluxes adapted for detecting a focus condition to an object, which are incident on the CCD line sensors $P_0$, $P_{01}$, and $P_{02}$, can be used because they are not vignetted by the pupil of the photo-taking lens $TL_a$. That is, since a focus condition can be detected in all of the focus detection areas FA, $FA_1$, and $FA_2$ shown in FIG. 4 (refer to Table 2).

FIG. 16-(b) shows the case in which a photo-taking lens $TL_b$ has a small pupil. For example, a lens on which a teleconverter is attached applies to this case. Since the pupil $TL_{b0}$ of this lens is small, a light flux without being vignetted by the pupil of the photo-taking lens $TL_b$ is only an axial focus detection light flux. In this case, a focus condition can be detected only in the axial focus detection area Fa.

FIG. 16-(c) shows the case in which the position of the pupil $TL_{c0}$ of a lens changes. A shift lens applies to this case. If the shift amount of the lens is zero, a focus condition can be detected only in the axial focus detection area FA, but as the shift amount increases to $X_1$ and $X_2$ ($0 < X_1 < X_2$), focus detection area which can be detected changes (refer to Table 2).

FIG. 16-(d) shows the case in which the configuration of the pupil is peculiar such as that of a reflection telephoto lens. The portion shown by oblique lines indicates the portion in which a light flux is vignetted by a reflecting mirror (secondary mirror) of the reflection telephoto lens. In this case, the axial focus detection light flux cannot be incident on the CCD line sensor $P_0$, so that a focus condition cannot be detected in the axial focus detection area FA.

According to a reflection telephoto lens shown in FIG. 16-(e), the light flux is vignetted by a reflecting mirror in a small extent. Therefore, the axial focus detection light flux is capable of being incident on the CCD line sensor $P_0$.

As described above, which of the focus detection areas can be used depends on the kind of an exchangeable lens. In consideration of this, the lens ROM stores the individual information (focus detection signal) of the respective lenses as shown in Table 2.

TABLE 2

| kind of Lens | $P_{01}$, $FA_1$ | $P_{01}$, $FA_1$ | $P_{01}$, $FA_1$ | Focus Detection Signal |
|---|---|---|---|---|
| Lens with Great Pupil | O | O | O | 00H |
| Lens with Small Pupil | X | O | X | 01H |
| Shift Shift | X | O | X | 01H |

TABLE 2-continued

| kind of Lens | | P$_{01}$, FA$_1$ | P$_{01}$, FA$_1$ | P$_{01}$, FA$_1$ | Focus Detection Signal |
|---|---|---|---|---|---|
| Lens | Amount ○ | | | | |
| | Shift Amount X$_1$ | X | ○ | ○ | 02H |
| | Shift Amount X$_2$ | X | X | ○ | 03H |
| Re-flecting Telephoto Lens | Type A | ○ | X | ○ | 04H |
| | Type B | X | ○ | X | 01H |

Table 2 shows focus detection areas FA, FA$_1$, and FA$_2$ as well as the corresponding CCD line sensors P$_0$, P$_{01}$, and P$_{02}$ which can be used depending on the kind of a lens and the focus detection signals. The focus detection areas indicated by "O" and the CCD line sensors disposed in correspondence thereto can detect a focus condition. The focus detection signals consist of 8-bit data.

Figure 17:
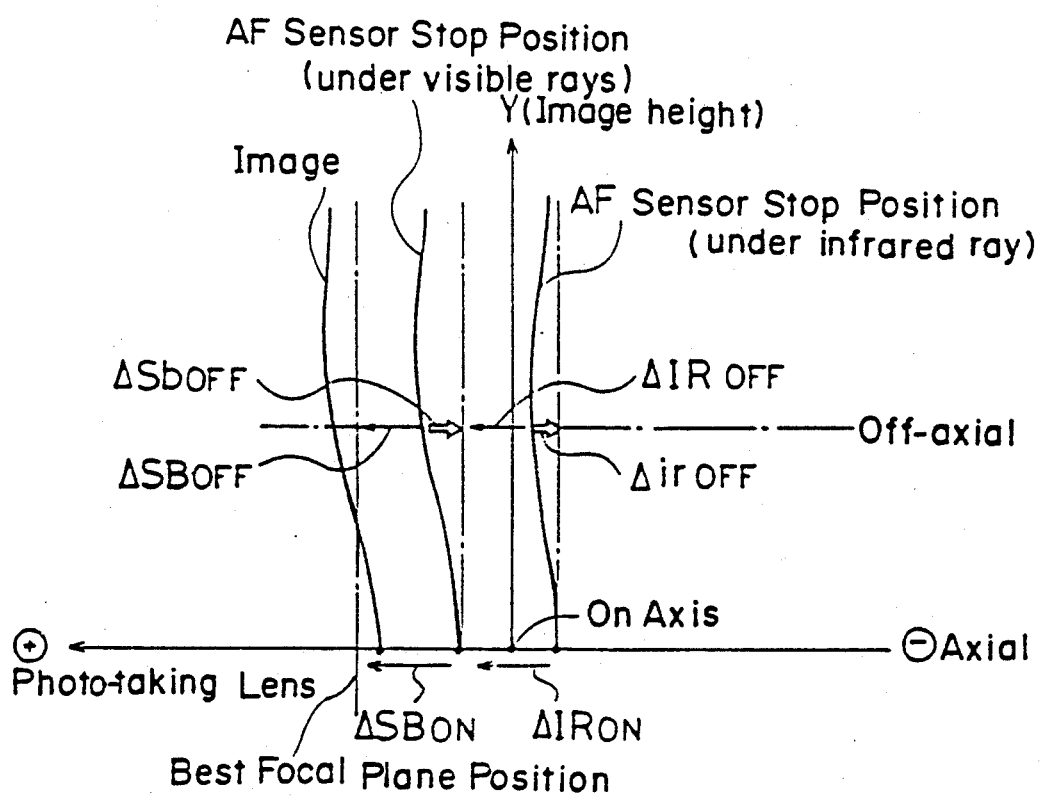
FIG. 17 is a view showing the relationship between an in-focus position caused by an AF sensor and the best focal plane position based on the aberration of a photo-taking lens.

FIG. 17 shows the relationship between the best focal plane positions at which film is located and the focus position detected by the CCD line sensor (hereinafter referred to as AF sensor) under visible and infrared light. The axis of abscissa X indicates optical axis, in which the left side indicates the direction (+ direction) of the photo-taking lens and the right side shows the direction (− direction) of the film surface. The axis of ordinate Y shows the distance from the optical axis on the plane perpendicular to the optical axis. At the position shown by "On Axis" an image performance of the lens by a light on the axis (incident light parallel to optical axis) is most favorable. If a film is disposed in this position, an aberration performance with respect to a light out of the axis (incident light oblique with respect to the optical axis) is unfavorable. Therefore a favorable defocus amount cannot be obtained by a focus condition detection using an off-axial focus detection light flux. In order to overcome this problem, the film is located slightly distant best focal plane position from the position shown as the "On Axis" in consideration of the axial light and the off-axial light. In the curve shown as an image, the contrast of image by an actual light which passes through the photo-taking lens is most favorable (for example, F=2.0).

As described above, the AF sensor detects a focus condition using the axial focus detection light flux or an off-axial focus detection light flux, which has the effect equivalent to the fact that the aperture value of the photo-taking lens becomes great. Therefore, the aberration performance given on the AF sensor is more favorable than that of the photo-taking lens. The in-focus determining position to be made by the AF sensor is shown in FIG. 17 as the stop position of the AF sensor under a visible light or an infrared ray. When a focus condition cannot be detected under a visible light, an infrared ray is emitted from a complementary light emitting circuit provided in the camera body. Thus, the focus condition can be detected by the infrared ray. The complementary light emitting circuit may be mounted on a device outside the camera body, for example, on an electronic flash emitting device.

Thus, there is a dislocation between the AF sensor stop position and the best focal plane position, and the dislocation amount changes according to the distance from the optical axis (image height). Therefore, according to the present invention, the focus condition detected by the Af sensor is corrected based on the dislocation amounts $\Delta SB_{on}$, $\Delta SB_{off}$, $\Delta sb_{off}$, $\Delta IR_{on}$, $\Delta IR_{off}$, and $\Delta ir_{off}$ stored in the lens ROM which are shown in FIG. 17. Suffix ON means a correction amount on the focus detection area FA in which a focus condition is detected using the axial focus detection light flux. The suffix OFF means a correction amount on each of the focus detection areas FA$_1$, FA$_2$ in which a focus condition is detected using the off-axial focus detection light flux. Since the areas FA$_1$ and FA$_2$ are symmetrical with respect to the optical axis, the focus condition can be corrected using the same correction data.

In FIG. 17, $\Delta SB$ denotes the dislocation amount of the defocus amount between the AF sensor stop position and the best focal plane position under a visible light; $\Delta sb_{off}$ designates the dislocation amount of defocus amount between the AF sensor stop position on the optical axis and on the off-axial position under a visible light; $\Delta IR$ indicates the dislocation amount of defocus amount between the AF sensor stop position under an infrared ray under a visible light and $\Delta ir_{off}$ denotes the dislocation amount of defocus amount between the AF sensor stop position on the optical axis and on the off-axial position.

Since these dislocation amounts $\Delta SB$ and $\Delta IR$ are varied by the zooming or focusing of the photo-taking lens, the difference amounts according to the zooming or the focusing are stored in the lens ROM as a correction amount. But since the dislocation amount $\Delta sb_{off}$ and $\Delta ir_{off}$ are hardly varied by the zooming or the focusing, this dislocation amount may be stored in the lens ROM as a fixed value.

As shown by arrows in FIG. 17, $\Delta SB_{on}$, $\Delta SB_{off}$, $\Delta IR_{on}$, and $\Delta IR_{off}$ are positive correction amounts and $\Delta sb_{off}$ and $\Delta ir_{off}$ are negative correction amounts.

If the correction amounts $\Delta SB$ and $\Delta IR$ are varied by the focusing, similarly to the zoom encoder 61 shown in FIG. 15, an encoder for detecting a focal length may provided in the lens, whereby the address of the ROM may be designated according the outputs of this encoder and the decoder 62.

The operation of the CPU 108 provided in the camera body is described with reference to the flowchart shown in FIG. 18 through FIG. 29.

Figure 18:
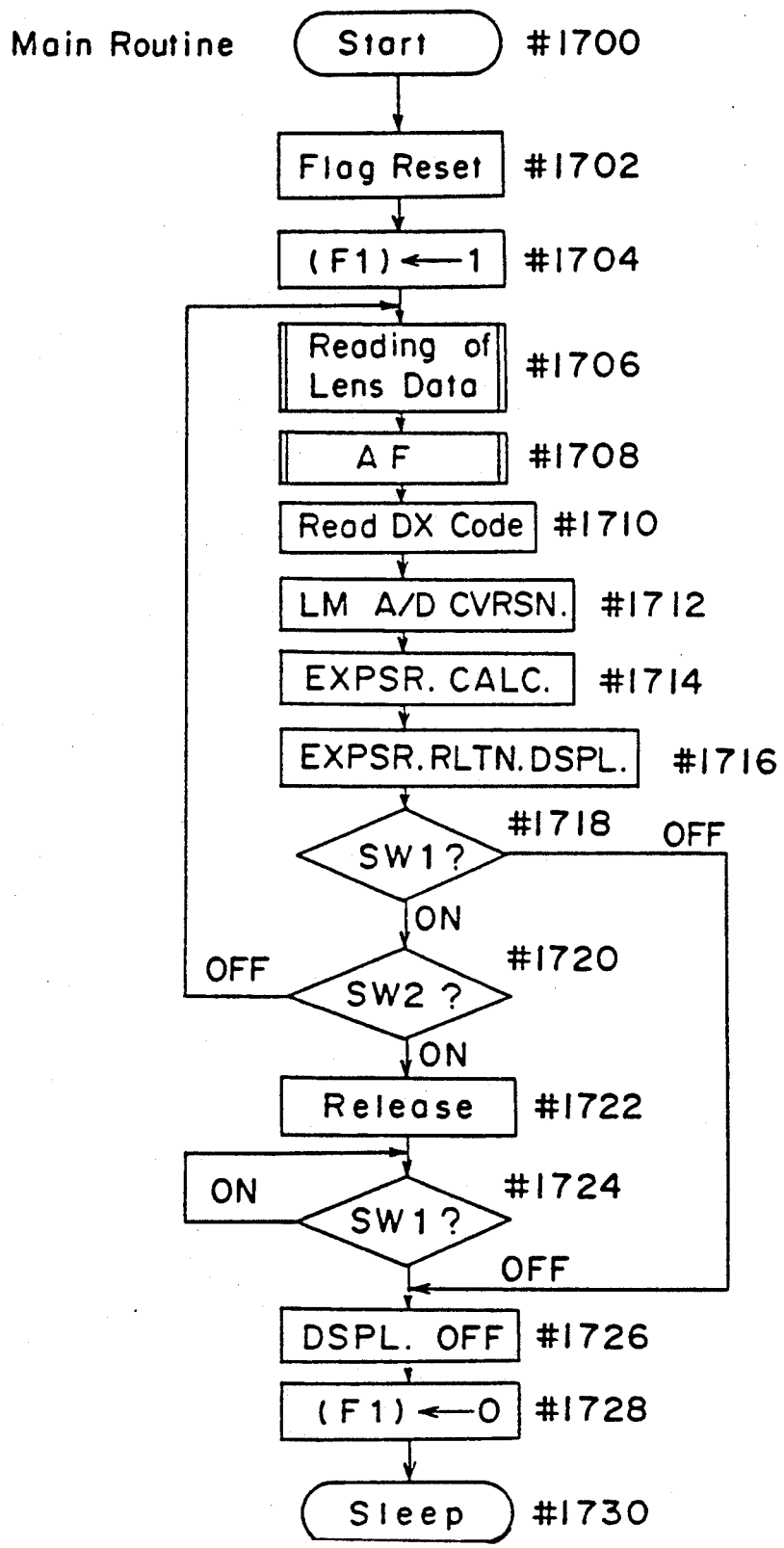
FIG. 18 is a flowchart showing the main operation of the CPU in the system.

FIG. 18 is a flowchart showing the main routine of the operation program of the CPU 108. When the switch SW$_1$ is ON by the depression of the shutter release button to the first half of its full stroke, the program is initiated from step #1700, then, flags shown in Table 3 are reset to 0 at step #1702.

The flags to be used in the CPU 108 are described in Table 3. The detailed descriptions of the flags are made later.

TABLE 3

| Flag | Name of Flag | 1 | 0 |
|---|---|---|---|
| F1 | Read Flag | First Reading ROM Data after Initiation of CPU | Reading ROM Data after First Reading |
| F2 | Lens Generation Flag | Conventional Lens | New Lens |
| F3 | Lens Flag | Lens Mounting Condition | Lens Non-mounting Condition |
| F4 | Serial Flag | Read Processing of Serial Data by 1-byte is completed | Read Procesing of Serial Data is not completed |
| AFF | AF Flag | AF Operation | AF Operation |

TABLE 3-continued

| Flag | Name of Flag | 1 | 0 |
| --- | --- | --- | --- |
| LCF | Low Contrast Flag | is not performed Focus Condition cannot be detected | is performed Focus Condition can be detected |
| LCF$_1$ | Low Contrast Flag 1 | Focus Condition cannot be detected in Area FA$_1$ | Focus Condition can be detected in Area FA$_1$ |
| LCF$_2$ | Low Contrast Flag 2 | Focus Condition cannot be detected iin Area FA | Focus Condition can be detected in Area FA |
| LCF$_3$ | Low Contrast Flag 3 | Focus Condition cannot be detected in Area FA$_2$ | Focus Condition can be detected in Area FA$_2$ |
| F5 | Complementary Light Flag | Complementary Light is emitted | Complementary Light is not emitted |

At step #1704, since the data stored in the ROM is first read after the CPU is initiated, a read flag F1 is set to 1, then the program goes to a subroutine, for reading lens data, of step #1706. As described later, in this subroutine for reading the lens data, the data stored in the ROM is read, whether or not the lens is mounted and a lens generation are detected. Thereafter, the program returns to the main routine.

Then, the program goes to an automatic focus subroutine (hereinafter referred to as AF subroutine) at step #1708. As described later, in the AF subroutine, the focus condition is detected, i.e., the photo-taking lens is driven to be in-focus condition.

At step #1710, the data of a film sensitivity is read into the CPU 108 through the film sensitivity information circuit 360. At step #1712, the light measuring of the luminance of the field and an A/D conversion thereof are performed by the light measuring circuit 310 so as to obtain the data of the luminance value. Based on these data, an exposure calculation is performed according to the known method at step #1714, then the calculated exposure data is transferred to the display circuit 340 which displays the data at step #1716.

Next, it is detected at step #1718 whether or not the switch SW1 still remains ON. If the switch SW1 is OFF, the program goes to step #1726 at which the display of the display circuit 340 is all cleared, and the read flag F1 is reset to 0 at step #1728, and then, the CPU 108 enters into a sleep state at step #1730.

If it is decided at step #1718 that the switch SW1 is ON, it is detected at step #1720 whether or not the switch SW2, which is turned on when the button is completely depressed through the full stroke, is ON. If the switch SW2 is ON, the known release operation is carried out at step #1722. After the release operation is completed, the proceeding of the program is waited at step #1724 until the switch SW1 becomes OFF, then the program goes to step #1726. If it is detected at step #1720 that the switch SW2 is OFF, the program returns to step #1706 so as to repeat the operation starting from read of the lens data.

Figure 19:
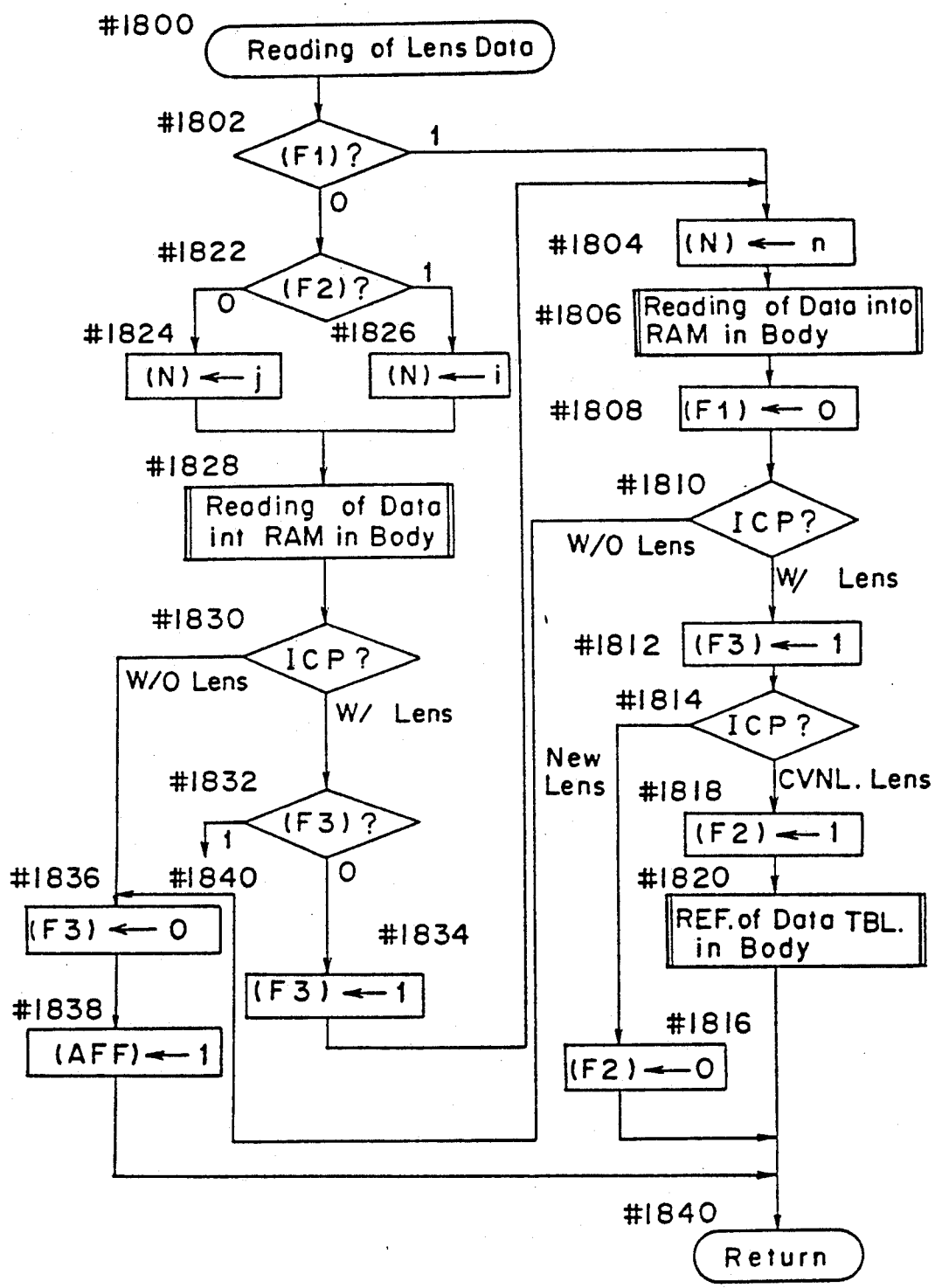
FIG. 19 is a flowchart showing a subroutine for reading ROM data.

The flowchart shown in FIG. 19 shows the subroutine for reading lens data with respect to step #1706 in FIG. 18. It is detected at step #1802 whether or not the read flag F1 is 1 or 0, i.e., it is detected whether or not the data of the ROM is read for the first time or twice or more after the CPU is initiated. If it is detected that the data of the ROM is read for the first time, the program goes to step #1804. If it is detected that the ROM has been read twice or more, the program goes to step #1822.

Before proceeding to the description of the read operation, the lens information stored in the lens ROM is described hereinbelow with reference to FIG. 30. The ROM in the exchangeable lens stores individual lens information necessary for such as an exposure control and AF control at each specified address thereof as 8-bit digital data. But with the increase of the functions of the camera system due to the development of the camera system, the information (conventional data) stored in the ROM provided in the conventional lens does not allow the camera to control the developed function. In this respect, the ROM which has stored the information (new data) on the new function in addition to the conventional information may be provided in the developed new lens to control the developed function. FIG. 30 is a comparison view of the area map for comparing the conventional lens and the new lens.

The information $d_1$ through $d_i$ (conventional data) of the conventional lens is stored by the ROM provided in the conventional lens at the addresses of 1 through i and the lens information $d_n$ (data for identifying the kind of the lens) is stored at the last address of n. No lens information is stored at the addresses of $i+1$ through $n-1$, namely, vacant addresses. The ROM mounted on the new lens has the same capacity as the ROM provided in the conventional lens. The new ROM stores the conventional data $d_1$ through $d_i$ at the addresses of 1 through i, new lens information $d_{i+1}$ through $d_j$ (new data) at the addresses of $i+1$ through j and the data dn for identifying the kind of the lens at the last address of n.

In the lens defined as the conventional lens in accordance with the present invention, the dislocation amount $\Delta SB_{on}$, $\Delta IR_{on}$ between the best focal plane position and the AF sensor stop position is stored in the lens ROM as the correction amount only on the focus detection area FA in which a focus condition is detected using the axial focus detection light flux (refer to Table 4). On the other hand, the dislocation amount $\Delta IR_{off}$, $\Delta SB_{off}$ or $\Delta ir_{off}$, $\Delta sb_{off}$ on the focus detection areas FA$_1$ and FA$_2$ are also stored in the lens ROM in the new lens.

Returning to FIG. 19, description is made with regard to the operation of reading the data of the ROM to be performed if the read flag F1 is 1 at step #1802, namely, the operation of reading the data of the ROM for the first time after the CPU 108 is started. Since this is the first time read, the number n of all the addresses number of the ROM is set to the serial data counter N at step #1804 as the number of read data. At step #1806, according to the subroutine for reading the data into the camera body, n pieces of ROM data corresponding to the current lens condition due to a zooming or a focusing are stored in the RAM provided in the camera body. Thus, the first time read is completed. Then, the read flag F1 is reset to 0 at step #1808.

The data called ICP is stored by the ROM at the first address thereof. Of eight bits, the high-order two bits consist of the data for detecting whether or not the lens is mounted on the camera body and the remaining six bits consist of lens generation identifying data which indicates whether the lens is conventional or new. It is detected at step #1810 whether or not the lens is mounted on the camera body utilizing the high-order two bits of the ICP. If the lens is not mounted on the camera body, the program goes to step #1836 at which the lens flag F3 is reset to 0 to indicate the non-mounting of the lens, and at step #1838, the AF flag AFF is set to 1 to indicate that the AF operation is not effected. Then, the program returns.

If it is decided at step #1810 that the lens is mounted on the camera body, the lens flag F3 is set to 1 at step #1812 so as to indicate that the lens is mounted, then the program goes to step #1814 at which the lens generation is identified. It is detected at step #1814 whether the lens mounted on the camera body is conventional or new utilizing the remaining six bits of the ICP. If it is decided that the lens is new, necessary information is all stored in the RAM provided in the camera body, then the program goes to step #1816 at which the lens generation flag F2 is reset to 0. Thereafter, the program returns. When the lens generation flag F2 is set to 1, it indicates that the conventional lens is mounted on the camera body. When the lens generation flag is 0, it indicates that the new lens in mounted on the camera body.

If it is decided at step #1814 that the lens mounted on the camera body is conventional, the lens generation flag F2 is set to 1 at step #1818 and new data not stored in the ROM is read at step #1820 from data table provided in the camera body according to the subroutine for referencing the data table provided in the camera body. Then, the program returns.

If it is decided that the read flag F1 is 0 at step #1802, it means that the CPU 108 has read the ROM data once or more. Then, it is detected at step #1822 the lens mounted on the camera body is conventional or new using the lens generation flag F2. If it is decided that the lens is new, the number j is set to a serial data counter N at step #1824 as the number of read data of the ROM. If it is decided that the lens mounted on the camera body is conventional, the number i is set to the serial data counter N at step #1826. Then, similarly to the operation to be performed at step #1806, the read subroutine for reading the data into the RAM in the camera body is executed at step #1828. As described above, it is to be noted that j>i. Thus, the period for reading the data of the ROM is shortened by selecting the number of read data.

Similarly to step #1810, at step #1830, it is detected whether or not the lens is mounted on the camera body according to the read ICP data. If it is decided that the lens is mounted on the camera body, the program goes to step #1832 at which the lens flag F3 is identified to detect whether or not the lens was mounted on the camera body at the previous read of the lens data. If it is decided that lens flag F3 is 0, it means that the lens was not mounted on the camera body at the previous read of the lens data and the lens is mounted thereon currently, so that the lens flag F3 is set to 1 at step #1834, which indicates that the lens is mounted. Then, the program goes to step #1804 so as to read n pieces of ROM data again.

Figure 20:
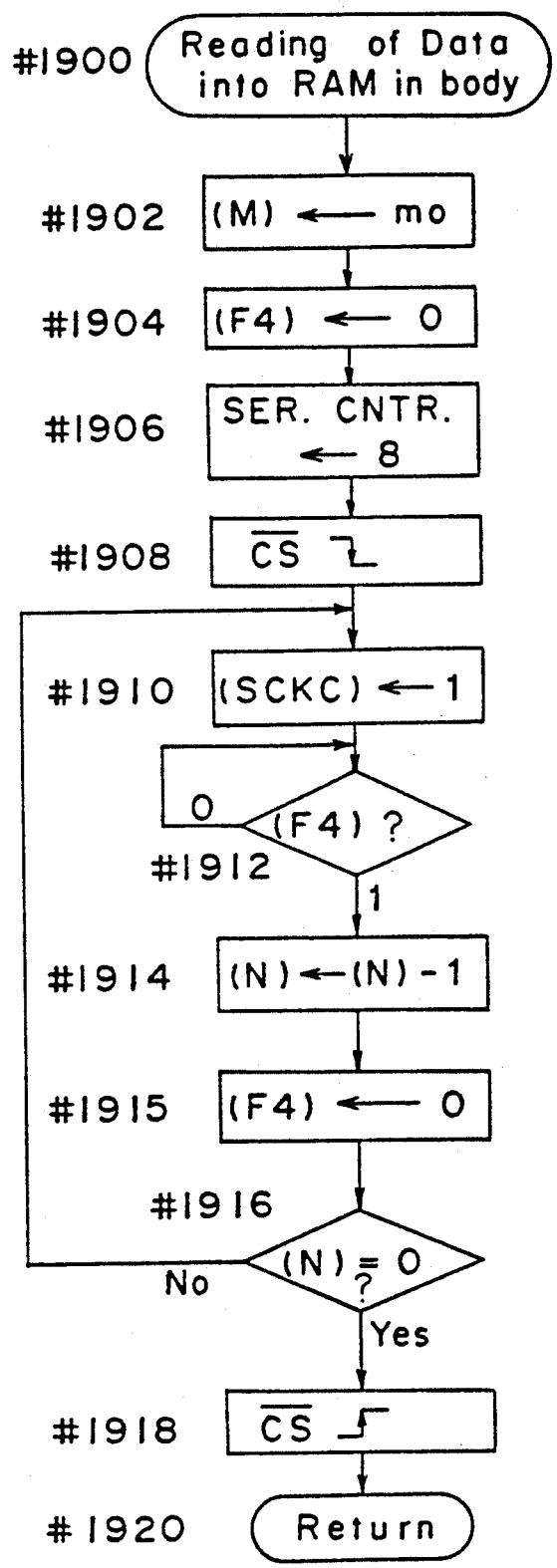
FIG. 20 is a flowchart showing a subroutine for reading the ROM data into a RAM provided in the camera body.

The flowchart shown in FIG. 20 is the read subroutine for reading the ROM data into the RAM in the camera body, according to the steps #1806 and #1828 in FIG. 19. First, at step #1902, the address $m_0$ is set to the address pointer of the RAM. Similarly to the ROM, the RAM consists of eight bits. Next, at step #1904, the serial flag F4 is reset to 0 to indicate that the read processing of the serial data of the ROM is not completed, then set 8 to the serial counter 120 shown in FIG. 2-(b) at step #1906 so that the serial counter 120 counts the clock pulse of eight bits.

When the output terminal CS shown in FIG. 2-(b) becomes a low level at step #1908, the serial communication is possible between the camera body and the lens. When the serial port control register SCKC is set to 1 at step #1910, clock pulse starts to be outputted from the clock output terminal Sck shown in FIG. 2-(b). At step #1912, the interruption is waited, that is, the state that the serial flag F4 becomes 1 as a result of the interruption, i.e., the read of the 1-byte serial data of the ROM into the RAM is waited.

Figure 21:
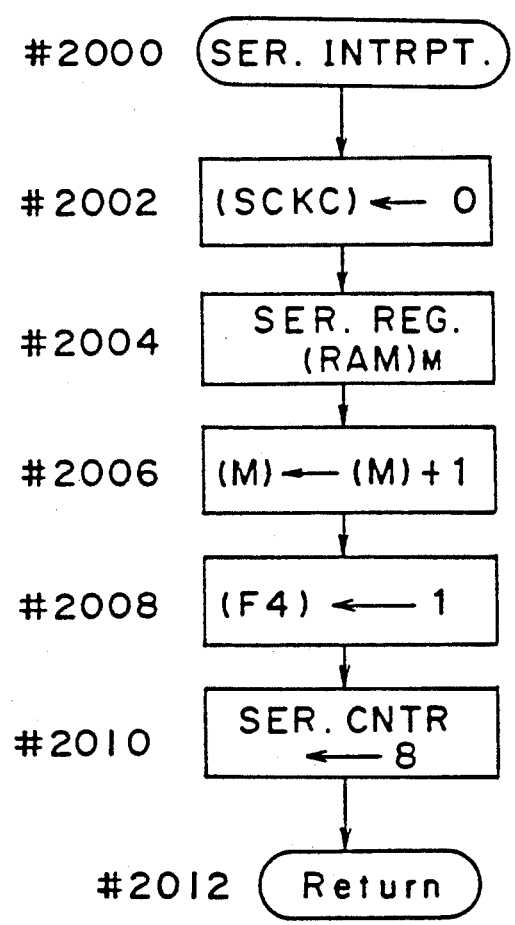
FIG. 21 is a flowchart showing a subroutine for the processing of a serial interruption into the CPU.

The processing operation of the serial interruption is described with reference to FIG. 21. When the serial counter 120 completes the counting of eight clock pulses, it produces an interruption signal INT which is transferred to the CPU 108. That is, while the CPU 108 waits until the serial flag F4 becomes 1 at step #1912 shown in FIG. 20, the serial counter 120 completes the counting of eight clock pulses and generates the interruption signal INT, then the program goes to the steps shown in FIG. 21. First, at step #2002, the serial port control register SCKC is reset to 0 so that the clock pulse is not outputted from the camera body to the lens. Next, at step #2004, the 8-bit data of the predetermined address of the ROM read into the serial register 121 is transferred to the address (first time, $m_0$) specified by the address pointer M provided in the RAM so as to be stored therein. At step #2006, the address pointer M which specifies the address in the RAM is advanced by one. At step #2008, the serial flag F4 is set to 1 to indicate that the read of the 1-byte serial data of the ROM into the RAM has been completed. At step #2010, the serial counter 120 is set to 8 to read the subsequent data of the ROM, then the program returns to step #1912 shown in FIG. 20.

Since it is decided at step #1912 that the serial flag F4 is set to 1, the program goes to step #1914 at which 1 is subtracted from the serial data counter N, then, at step #1915, the serial flag F4 is reset to 0 again.

At step #1916, it is detected whether or not all the ROM data indicated by the number set to the serial data counter N has been stored in the RAM provided in the camera body. If all the ROM data has been read, N becomes 0, so that at step #1918, the output terminal CS is set to a high level to permit the completion of the communication between the camera body and the lens. Then, the program returns. If all the data has not been read, the program returns to step #1910 to read the next ROM data.

Figure 22:
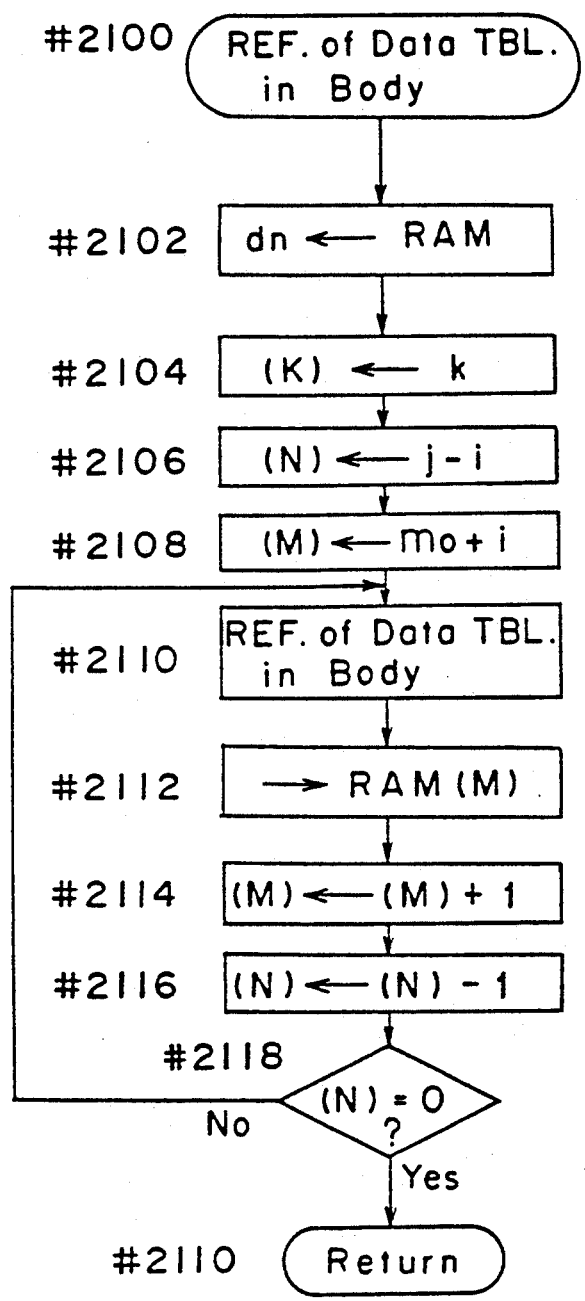
FIG. 22 is a flowchart showing a subroutine for referencing the data table provided in the camera body.

The flowchart shown in FIG. 22 is the subroutine for referencing the data table provided in the camera body, according to the step #1820 in FIG. 19. This subroutine shows the operation of storing the lens information (new data) not stored in the conventional lens in the RAM provided in the camera body with reference to the data table in the camera body when the conventional lens is mounted on the camera body.

Figure 31:
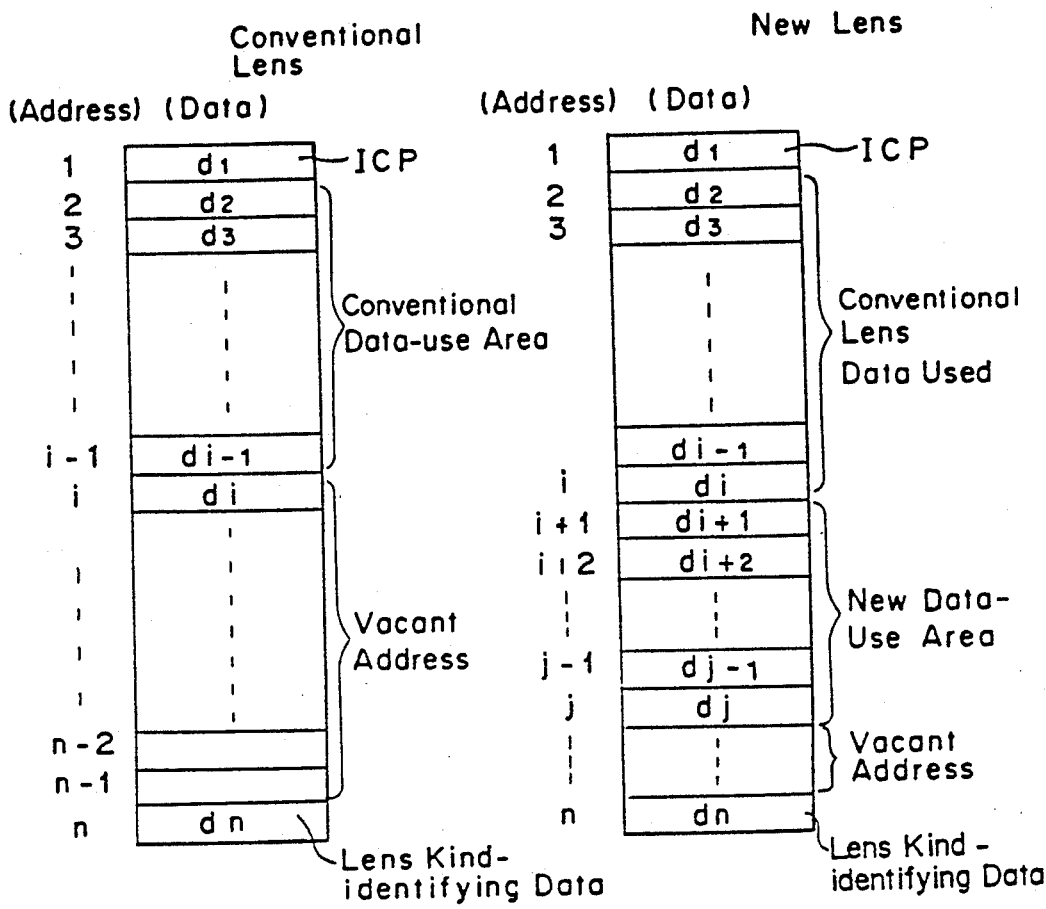
FIG. 31 shows an area map of the data table provided in the camera body.

FIG. 31 shows an area map of the data table provided in the camera body. The n address which is the last address of the lens ROM stores the data dn for identifying the kind of the lens regardless of whether the lens is conventional or new. The data dn for identifying the kind of the lens has any one of the values $dn_1$ through $d_{ne}$ depending on the kind of the lens. The data table provided in the camera body stores data ($d_{i+1}$ through dj) corresponding to the new data stored in the new lens according to the kind of the conventional lens.

Returning to the flowchart shown in FIG. 22, first, at step #2102, the CPU 108 receives the data dn for identifying the kind of the lens from the RAM. Based on the received data dn=dnk ($1 \leq k \leq 1$), the counter K is set to the data table area number k at step #2104. At step #2106, the serial data counter N is set to the number j-i which is the number of the reference data transferred from the data table provided in the camera body. At step #2108, the address pointer M of the RAM is set to the first address number $m_0+i$. The conventional data stored in the ROM already is stored in the RAM at the address number of $m_0 \sim m_0+i-1$.

At step #2110, 1-byte data dj+1 corresponding to the counter K is referenced from the data table provided in the camera body, thus being stored in the RAM at the address specified by the address pointer M. Similarly to the subroutine for reading the lens data, the data dj+1 through dj is referenced from data table provided in the camera body by one byte, thus being stored in the RAM.

Table 4 shows only the data, to be used in the embodiment, of the lens information to be stored in the RAM of the camera body. The addresses is shown in the Table 4 for convenience' sake. As described above in detail, in the conventional lens, the lens information of at least the addresses of 1 through 5 and n stored in the RAM are stored in the ROM. And in the new lens, the lens information of the addresses of 1 through 5, i+1 through i+4, and n stored in the ROM are stored in the ROM. In the conventional lens, the lens information corresponding to the addresses of i+1 through i+4 is read from the data table provided in the camera body depending on the kind of the conventional lens and is stored in the RAM. "Variable" shown in the Table 4 means that the data is varied by a zooming or a focusing. If a lens is not a shift lens, the shift amount of the shift lens is fixed to zero.

TABLE 4

| Stored Area in ROM | | Lens Information |
| --- | --- | --- |
| Conventional Data | 1 | Lens Mounting Signal ICP |
| (From ROM) | 2 | Fully Open Aperture Value AV0 |
| | 3 | $\Delta SB_{on}$ (Variable) |
| | 4 | $\Delta IR_{on}$ (Variable) |
| | 5 | Conversion Coefficient K |
| New Data | i + 1 | AF Detection Signal |
| (From ROM or | i + 2 | $\Delta SB_{off}$(Variable) or $\Delta sb_{off}$(Fixed) |
| Data Table in | i + 3 | $\Delta IR_{off}$(Variable) or $\Delta ir_{off}$(Fixed) |
| Body) | i + 4 | Shift Amount of Shift Lens |
| Address of n | n | Data for identifying kind of Lens |

Figure 23:
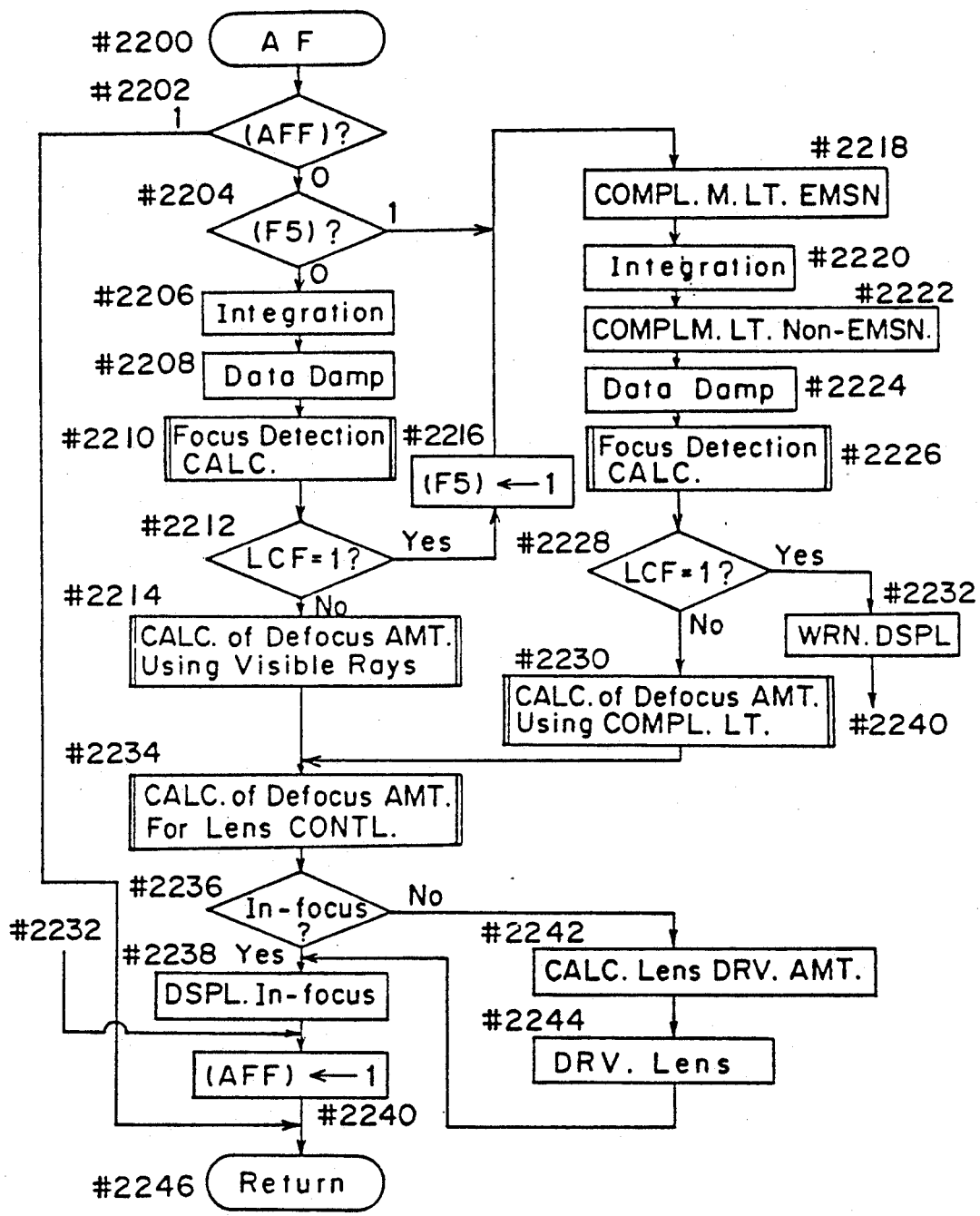
FIG. 23 is a flowchart showing a subroutine for detecting an automatic focus condition.

FIG. 23 is a flowchart showing the AF subroutine of step #1708 shown in FIG. 18.

At step #2202, the state of an AF flag AFF is detected. The AF flag AFF is set to 1 at step #1810 or #1830 shown in FIG. 19 when the lens is not mounted on the camera body or set after an in-focus condition is obtained as described later. That is, when the AF flag AFF is set to 1, it means that an in-focus condition has been obtained or the lens has not been mounted on the camera body. Therefore, the program returns to step #2246 without carrying out a focus detecting operation. If the AF flag AFF is 0, the state of the complementary light flag F5 is detected at step #2204. If the complementary light flag F5 is set to 1, the program goes to steps #2218 through #2232 at which a focus detecting operation is performed using the complementary light.

If the complementary light flag F5 is 0 at step #2204, the integrations are performed by the AF sensors (CCD line sensor) $P_0$, $P_{01}$, and $P_{02}$ at step #2206 according to the known method and the integrated data is damped at step #2208.

Step #2210 is the subroutine for, using the integrated data, calculating a focus detection. The operation of this subroutine is described with reference to the flowchart shown in FIG. 24. At step #2302, the focus detections are calculated in each of the focus detection areas FA, $FA_1$, and $FA_2$. In calculating the focus detection, the calculation of the contrast of the object and the correlation calculation are performed by using the signals of AF sensors to create the data which is necessary for deciding whether or not the focus condition can be detected and the data indicating the reliability of the detected focus condition. The detailed description of the calculating method is described in, for example, in Japanese Laid-Open Patent Publication No. 60-4914, the application of which was filed by the present applicant.

At step #2304, low contrast flags LCF, $LCF_1$, $LCF_2$, and $LCF_3$ are reset to 0. These low contrast flags indicate whether or not the focus condition can be detected. If they are 1, it indicates that the focus condition cannot be detected, and if 0, it indicates that the focus condition can be detected. On the other hand, the AF detection signal stored in the lens ROM specifies a focus detection area which can be used depending on the configuration of a lens irrespective of the result of the calculation of the focus condition detection.

At step #2306, it is detected whether or not a focus condition has been able to be detected in the focus detection area $FA_1$ based on the focus condition detection calculated by the AF sensor $P_{01}$ arranged in correspondence with the focus detection area $FA_1$. If it is decided that the focus condition detection has been able to be detected, no operation is performed. If the focus condition has been able to be detected, the low contrast flag $LCF_1$ for the area $FA_1$ is set to 1 at step #2308, then the program goes to step #2310. At step #2310 through step #2316, it is detected whether or not focus condition has been able to be detected in the areas FA and $FA_2$.

Next, at step #2318, the CPU 108 receives AF detection signal stored in the RAM provided in the camera body. If received data is 00H, the program goes to step #2320. If data is 01H, the program goes to step #2330. If data is 02H, the program goes to step #2336. If data is 03H, the program goes to step #2344. If the data is 04H, the program goes to step #2350 (refer to Table 2). It is detected in each of the above flows whether or not the focus condition has been able to be detected, in each of the focus condition detection areas specified by the AF detection signal, referring to the low contrast flag for the area. If the focus condition has not been able to be detected according to the calculations of the focus condition detections in all the focus detection areas specified by the AF detection signal, the low contrast flag LCF is set to 1, then the program returns. On the other hand, if the focus condition has been able to be detected in one or more detecting areas, the program returns. For example, if the CPU 108 receives 02H as the AF detection signal, the program goes from step #2318 to step #2336. Since the AF detection signal 02H specifies FA and $FA_2$ as the focus detection areas, it is detected based on the low contrast flags LCF2 and LCF3 whether or not the focus condition has been able to be detected. If it is decided at step #2338 that the low contrast flag LCF2 is 0, the focus condition has been able to be detected at least in the focus detection area FA. Therefore, the program returns. If the low contrast flag LCF2 is 1 at step #2338 and if the low contrast flag LCF3 is 0 at step #2340, the focus condition has been able to be detected at least in the focus detection area FA₂. Then, the program returns. If both low contrast flags are 1, the focus condition has been able to be detected in all the areas, so that the low contrast flag LCF is set to 1 at step #2342, then the program returns. A similar operation is performed when other AF detection signals are received.

Returning to the flowchart shown in FIG. 23, at step #2212, it is detected whether or not the focus condition has been able to be detected based on the low contrast flag LCF determined in the subroutine for calculating the focus condition detection. If the low contrast flag LCF is 1, the focus condition has not been able to be detected in any of the areas. Accordingly, the complementary light flag F5 is set to 1 at step #2216, then the program goes to step #2218 and the steps subsequent thereto at which the focus detecting operation is performed using the complementary light. When the contrast of the object is very low or the luminance thereof is very low, it is impossible to detect a focus condition. Therefore, at steps subsequent to step #2218, the integration of the received light is performed by emitting the complementary light from the complementary light circuit 350 provided in the camera body. The calculation for detecting the focus condition to be performed at steps #2226, #2228 and the detection as to whether or not the focus condition has been able to be detected are carried out similarly to the operation to be performed at step #2210 and #2212. If the focus condition has not been able to be detected even if the integration of the received light is performed by emitting the complementary light, a warning that the focus condition has not been able to be detected is displayed by the display circuit 340 at step #2232, then the AF flag AFF is set to 1. Thereafter, the program returns to steps #2240 and #2246.

The subroutine for calculating a defocus amount to be performed at step #2214 or #2230 is described with reference to the flowcharts shown in FIGS. 25 through 28.

Figure 25:
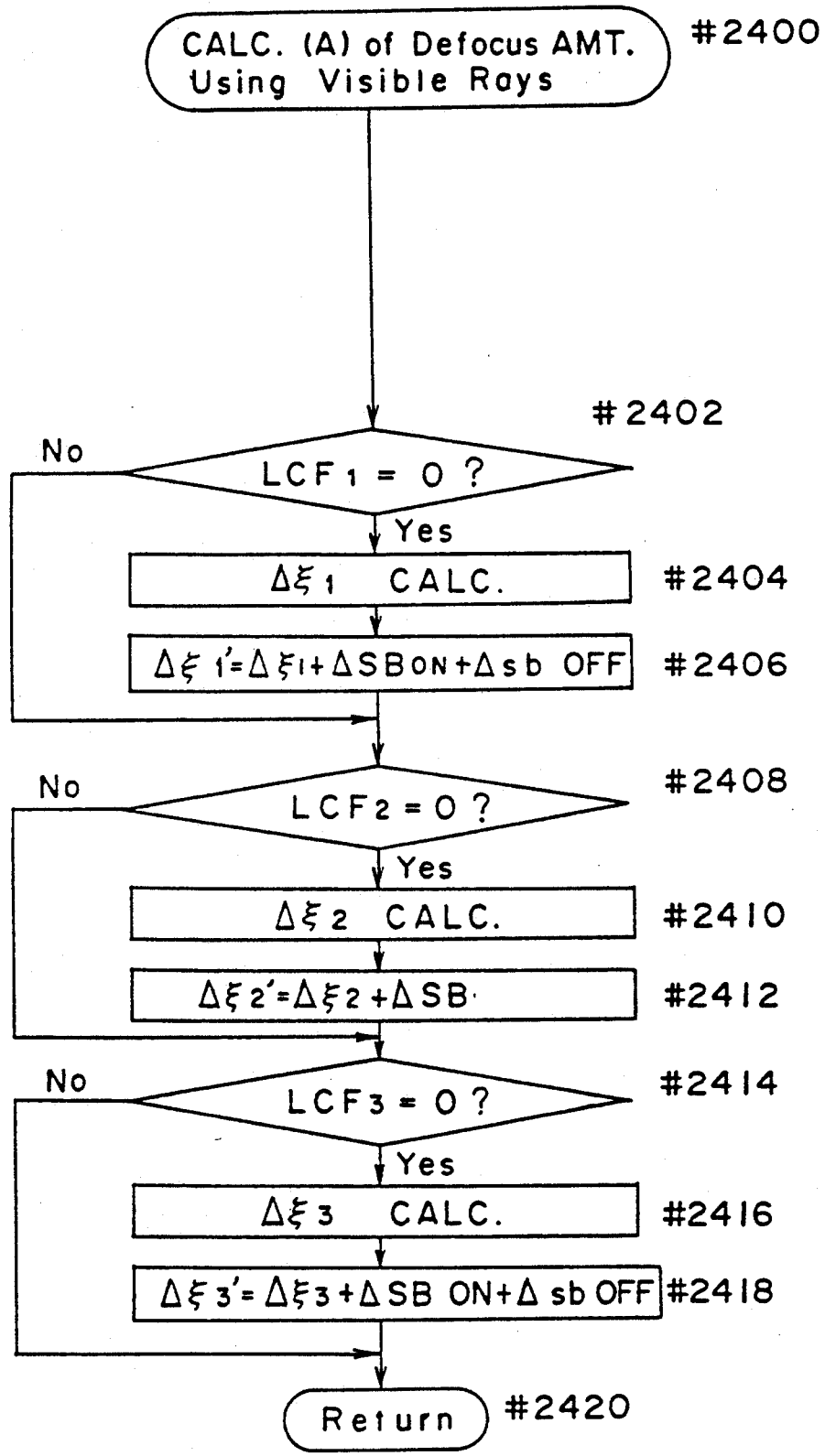
FIG. 25 is a flowchart showing an embodiment of a subroutine for a defocus amount calculation under a visible light.

The flowchart shown in FIG. 25 is one embodiment of the subroutine for the defocus amount calculation A under a visible light. At step #2402 through step #2406, a defocus amount is calculated in the focus detection area FA₁. The state of the low contrast flag LCF1 corresponding to the focus detection area FA₁ is detected at step #2402. If the flag LCF1 is 1, the focus condition has not been able to be detected in the area FA₁, i.e., the defocus amount cannot be calculated, so that the program goes to step #2408. At step #2404, the defocus amount $\Delta\xi 1$ is calculated based on the result obtained by the calculation for detecting a focus condition. As described above with reference to FIG. 17, there is a dislocation amount between the best focal plane position which is the actual film face and the AF sensor stop position. Accordingly, the defocus amount $\Delta\xi 1$ obtained by the calculation for detecting the focus condition based on the output of the AF sensor is accurately incapable of displaying the best focal plane position. Therefore, at step #2406, a correcting calculation to form the image on the best focal plane position is performed. That is, the correction is made by the following calculation.

$$\Delta\xi 1' = \Delta\xi 1 + \Delta SB_{on} + \Delta sb_{off} \qquad (1)$$

where $\Delta SB_{on}$ is conventional and variable data caused by a zooming or a focusing, $\Delta sb_{off}$ is new and fixed data which does not change due to the zooming or the focusing.

Similarly, at step #2408 through #2412, the defocus amount in the focus detection area FA is calculated. The defocus amount $\Delta\xi 2$ obtained by the calculation for detecting the focus condition is corrected by the following calculation.

$$\Delta\xi 2' = \Delta\xi 2 + \Delta SB_{on} \qquad (2)$$

That is, since the focus condition is detected in the focus detection area FA using axial focus detection light flux, the defocus amount is corrected using only conventional data $\Delta SB_{on}$ which is variable.

At step #2414 through #2418, the defocus amount in the focus detection area FA₂ is calculated. The correcting calculation is the same as the equation (1):

$$\Delta\xi 3' = \Delta\xi 3 + \Delta SB_{on} + \Delta sb_{off} \qquad (3)$$

The feature of the subroutine for the calculation A of the defocus amount under a visible light is that variable data for the off-axis is created utilizing the variable data $\Delta SB_{on}$ for the optical axis stored in the ROM provided in the conventional lens as the conventional data. Therefore, the data to be newly stored is only the fixed data $\Delta Sboff$. In the focus detection areas FA₁ and FA₂, a focus condition is detected based on a light flux which pass through the areas symmetrical with respect to the optical axis of the lens. Therefore, the memory of one correction amount $\Delta sb_{off}$ is enough to be used to perform a correcting calculation.

Figure 26:
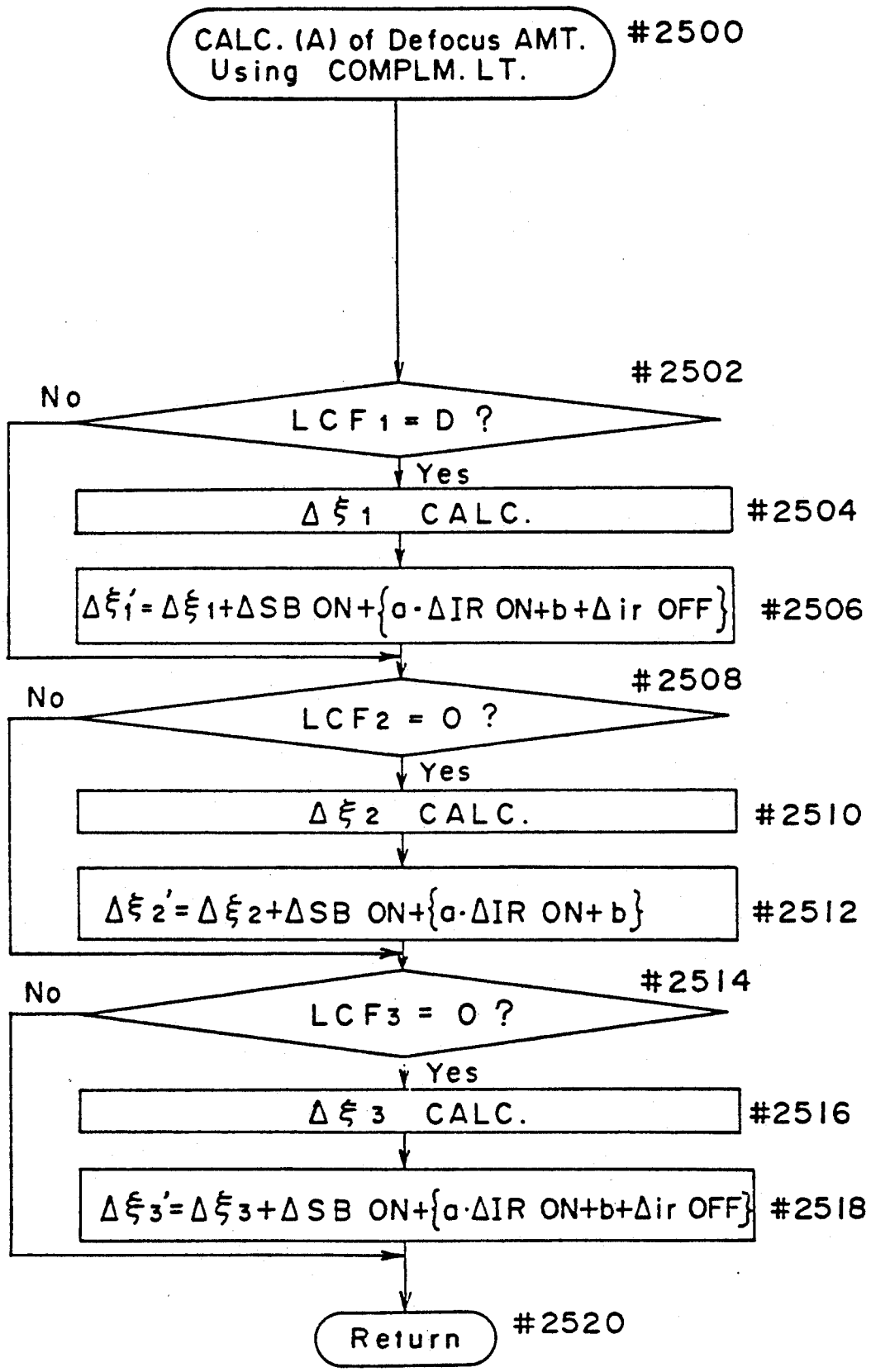
FIG. 26 is a flowchart showing an embodiment of a subroutine for a defocus amount calculation using a complementary light.

The flowchart shown in FIG. 26 is one embodiment of the subroutine of step #2230 at which the calculation A of the defocus amount is performed using a complementary light. Similarly to the calculation for correcting the defocus amount under a visible light in FIG. 25, new variable data is created using the new fixed data and the conventional variable data. Since the flow in this subroutine is the same as that shown in FIG. 25, only the correcting calculation is described hereinbelow.

When a focus condition is detected under an infrared light as a complementary light, the chromatic aberration of the lens necessitates an another correction other than the correction under a visible light (refer to FIG. 17). The correction of the defocus amount $\Delta\xi 2$ is performed by the following equation:

$$\Delta\xi 2' = \Delta\xi 2 + \Delta SB_{on} + (a \times \Delta IR_{on} + b) \qquad (4)$$

where $\Delta IR_{on}$ is conventional data which is variable by a zooming or a focusing; and (a) is a correction coefficient, showing the ratio of the correction amount $\Delta IR_{on}'$ in the wavelength of an infrared light used as the complementary light to the correction amount $\Delta IR_{on}$ obtained under an infrared light whose wavelength is 800 nm. The correction amounts $\Delta IR_{on}$ stored in the conventional lens and the new lens are the correction amount under the wavelength of 800 nm. Therefore, when the object is illuminated by a complementary light having the wavelength other than 800 nm, a correction which corresponds to the used wavelength is necessary. The reason why the ratio of $\Delta IR_{on}'$ to $\Delta IR_{on}$ is used as the correction coefficient (a) is because the chromatic aberration of the photo-taking lens changes linearly in the infrared wavelength region and because this ratio is not changed greatly by a zooming or a focusing. Reference symbol (b) in the above equation (4) denotes the characteristic for the infrared ray in the AF sensor module (block AFMO shown by dotted lines shown in FIG. 3), namely, the $\Delta IR$ correction value of the AF sensor module. The correction coefficient (a) or the correction value (b) are stored in the E$^2$PROM provided in the camera body.

The correction of the defocus amount $\Delta \xi$ obtained in the focus detection areas FA$_1$ or FA$_2$ is made by the following equation:

$$\Delta\xi' = \Delta\xi + \Delta SB_{on} + (a \times \Delta IR_{on} + b + \Delta ir_{off}) \quad (5)$$

where $\Delta ir_{off}$ is new data which is not varied by a zooming or a focusing. The new data to be stored is only the data $\Delta ir_{off}$.

Figure 27:
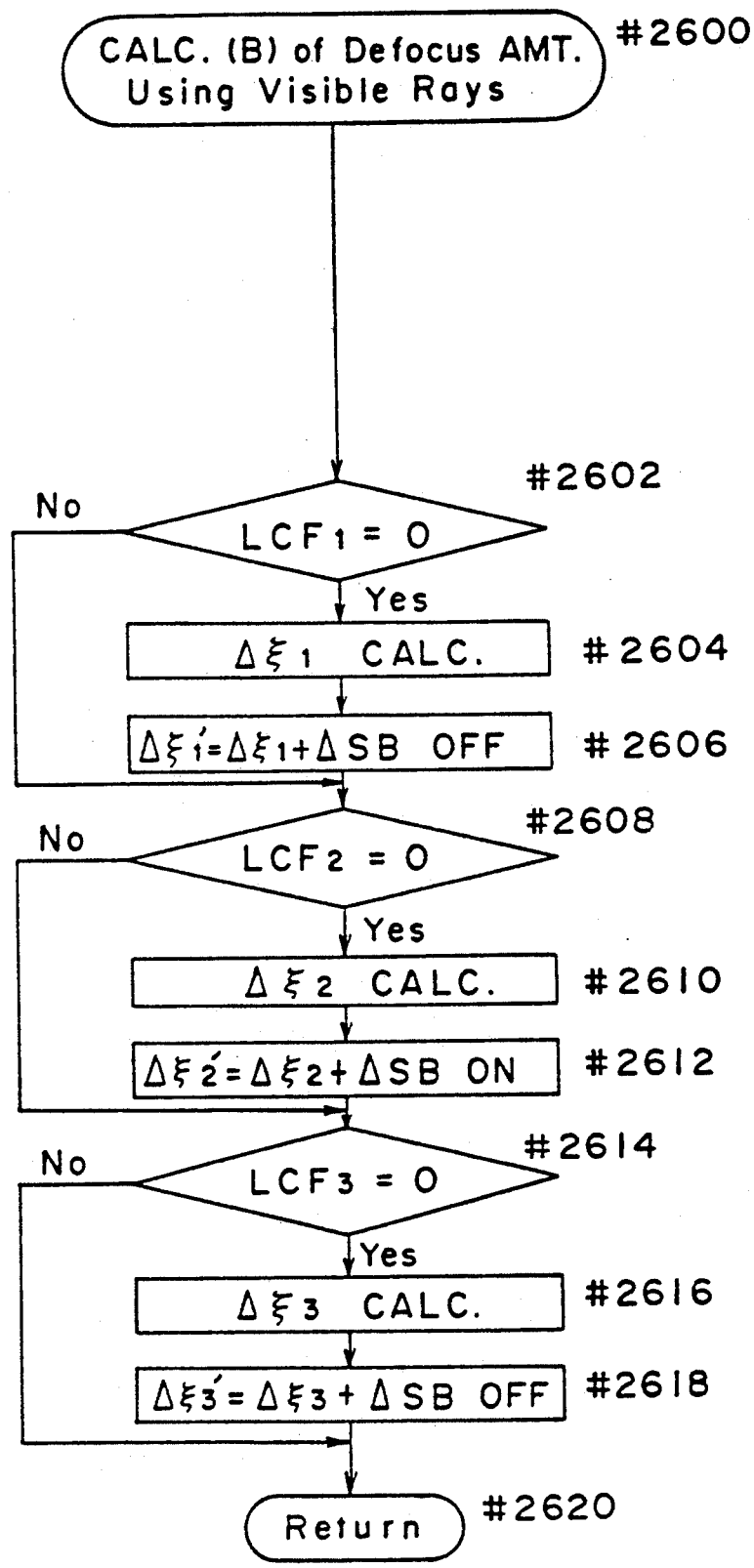
FIG. 27 is a flowchart showing another embodiment of a subroutine for a defocus amount calculation under a visible light.

The flowchart shown in FIG. 27 is the subroutine for the calculation B of a defocus amount under a visible light. This subroutine is another embodiment of the flowchart shown in FIG. 25. This embodiment is characterized in that new variable data $\Delta SB_{off}$ is previously stored in the ROM or the data table. That is, the defocus amounts $\Delta \xi$ obtained in the focus detection areas FA$_1$ and FA$_2$ are corrected as follows:

$$\Delta\xi' = \Delta\xi + \Delta SB_{off} \quad (6)$$

The correction of the defocus amount in the focus detection area FA is made by the equation (2) shown above in which the correction data of the axial focus detection light flux $\Delta SB_{on}$ is used.

Needless to say, the capacity of the ROM for storing new data must increase. This embodiment is effective for the lens in which the difference amount $\Delta sb_{off}$ between the AF sensor stop position on the optical axis and that out of the optical axis is greatly changed by a zooming or a focusing.

Figure 28:
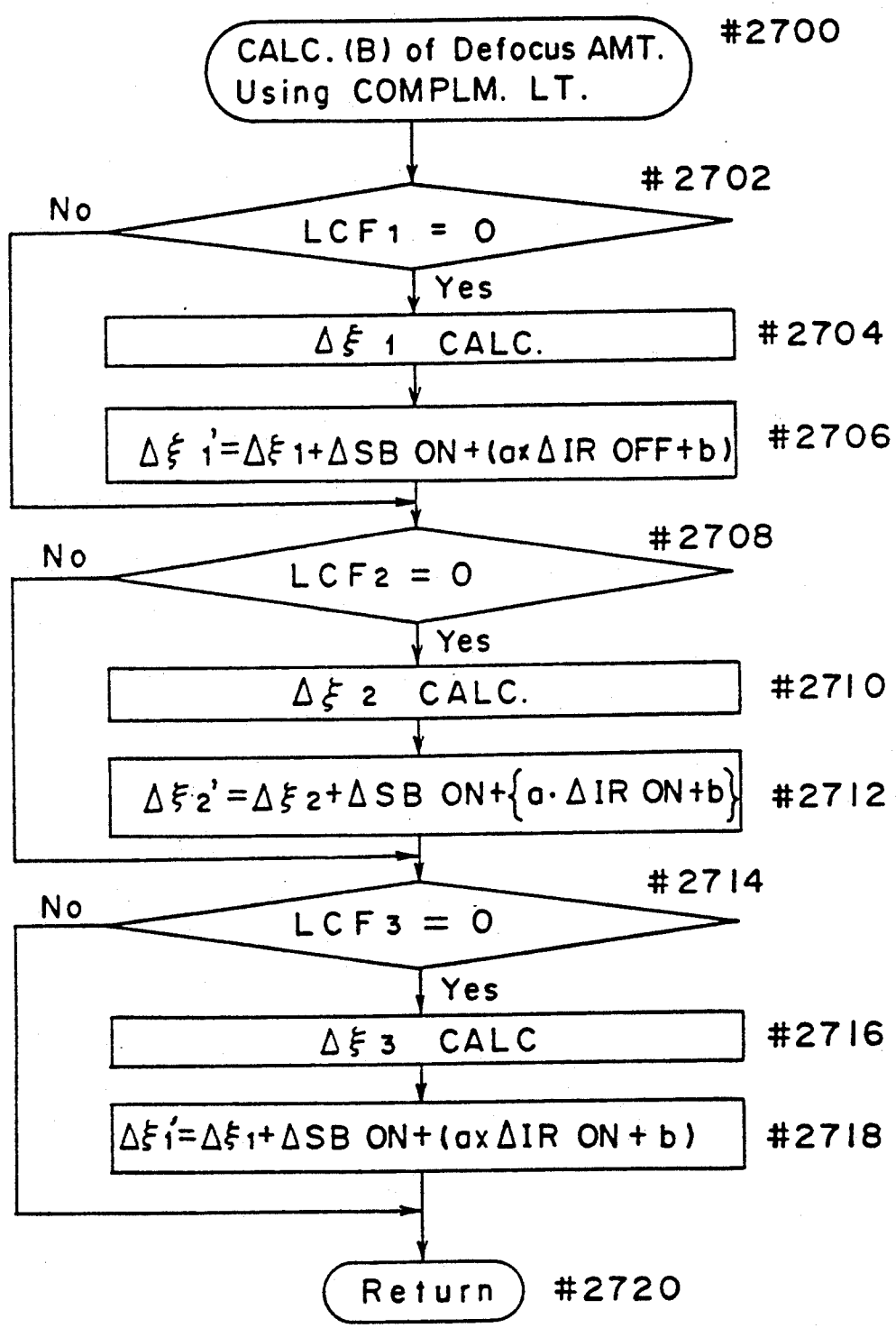
FIG. 28 is a flowchart showing another embodiment of a subroutine for a defocus amount calculation using a complementary light.

The flowchart shown in FIG. 28 is the subroutine for the calculation B of a defocus amount using a complementary light. This subroutine is another embodiment of the flowchart shown in FIG. 26. Similarly to the embodiment corresponding to the flowchart shown in FIG. 27, data $\Delta IR_{off}$ which is varied by a zooming or a focusing is stored as new data. The defocus amount $\Delta \xi$ obtained in the focus detection area FA$_1$ or FA$_2$ is corrected as follows:

$$\Delta\xi' = \Delta\xi + \Delta SB_{on} + (a \times \Delta IR_{off} + b) \quad (7)$$

The correction of the defocus amount in the focus detection area FA is made by the equation (4) shown above.

Returning to the flowchart shown in FIG. 23, step #2234 is a subroutine for calculating the controlling defocus amount necessary for driving the lens according to the corrected defocus amount of plural focus detection areas obtained at step #2214 or #2230. It is detected at step #2236 based on the calculated controlling defocus amount whether or not the current lens position is in an in-focus condition. If the lens is in the in-focus condition, the display circuit 340 displays at step #2238 that the lens is in the in-focus condition, then the program goes to step #2240. If the lens is not in the in-focus condition, a necessary lens drive amount is calculated at step #2242 according to the controlling defocus amount and the conversion coefficient K stored in the ROM so that the lens is driven at step #2244, then the program goes to step #2238.

Figure 29:
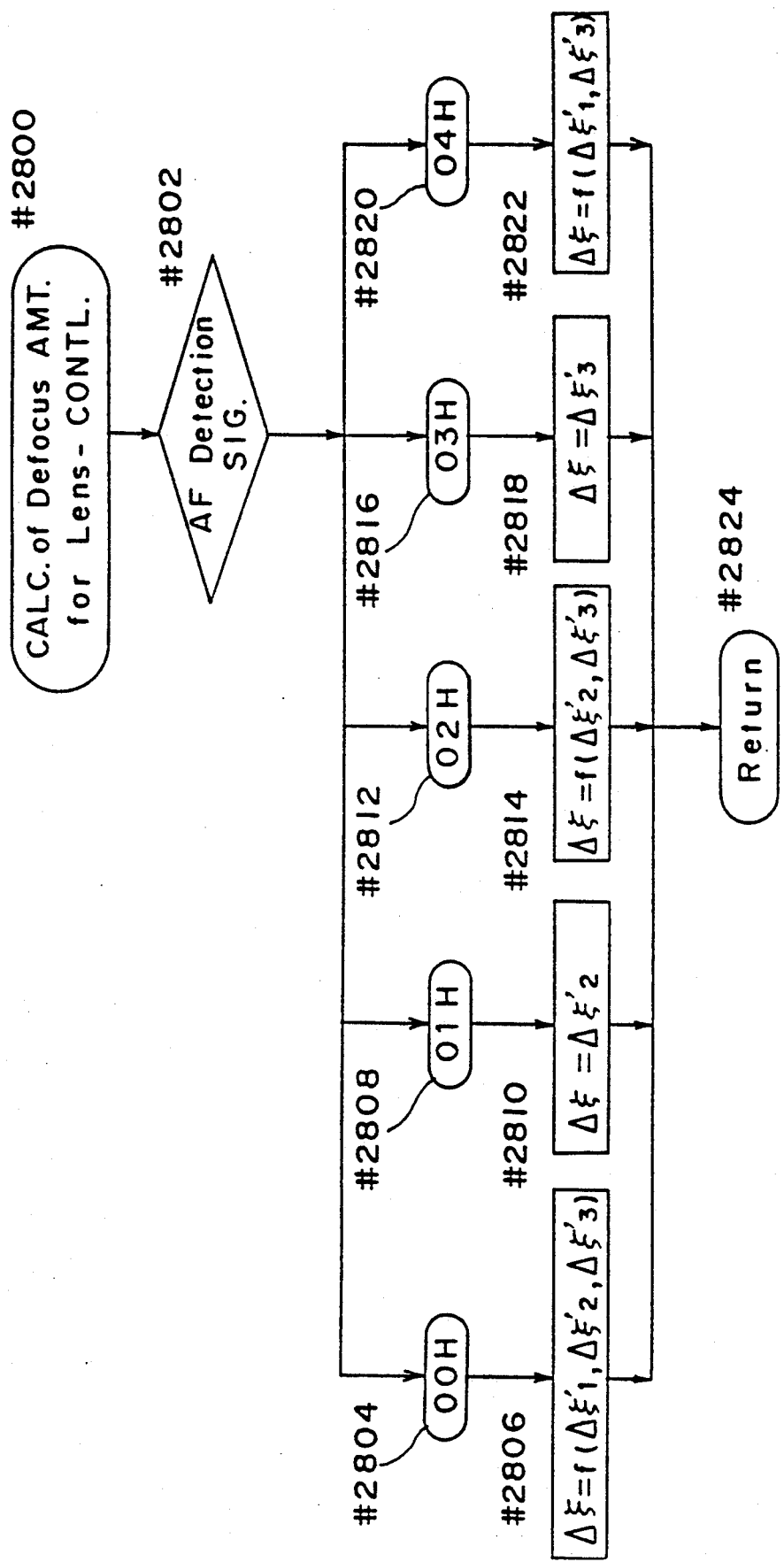
FIG. 29 is a flowchart showing a subroutine for calculating a lens controlling defocus amount.

The flowchart shown in FIG. 29 shows in detail a subroutine for calculating a controlling defocus amount with respect to step #1234 shown in FIG. 23. First, the AF detection signal stored in the RAM in the camera body is received at step #2802. In accordance with the data, the program goes to the flows. For example, if the AF detection signal is 00H, the controlling defocus amount for driving the lens is calculated by the equation $\Delta\xi = f(\Delta\xi 1', \Delta\xi 2', \Delta\xi 3')$ to be performed at step #2806. The function f selects an effective defocus amount from the defocus amounts $\Delta\xi 1'$, $\Delta\xi 2'$, and $\Delta\xi 3'$ of plural focus detection areas and calculates the controlling defocus amount according to the predetermined evaluation algorithm. If the AF detection signal is 01H, the defocus amount $\Delta\xi 2$ detected in the focus detection area FA is adopted as the controlling defocus amount at step #2810. When the AF detection signal is 02H, 03H or 04H, the controlling defocus amounts are calculated according to the respective flows. The detailed description thereof is described, for example, in Japanese Laid-Open Patent Publication No. 61-55618, the application of which was filed by the present applicant.

As described in detail, in the focus detecting system of the lens-exchangeable camera according to the embodiment, the storing means stores the first correction amount with respect to the aberration of the exchangeable lens when a focus condition is detected to an object on the optical axis, and the second correction amount with respect to the aberration of the exchangeable lens when a focus condition is detected to an object out of the optical axis, The first correction amount is used to correct a defocus amount obtained when the focus condition of an object present in an area in the vicinity of the optical axis of the exchangeable lens is detected, and the first and second correction amounts are used to correct a defocus amount obtained when the focus condition of an object present in an area out of the optical axis of the exchangeable lens is detected. Accordingly, the focus conditions of the objects present in both areas can be detected with a high accuracy.

In above embodiment, although the ROM in the new lens or the data table in the camera body stored the information with respect to the focus condition detection, the data table can store the information with respect to the exposure measurement, too. For example, if the exposure measurement region in the conventional camera system is all of the image plane and that in the new camera system is divided into plural areas on the image plane, deviation data, for the exposure measurement at open aperture between the conventional region and each of the new divided areas, are stored.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera system having a camera body and first and second lenses exchangeable to said camera body, comprising:
    said first lens comprising means for outputting first data which indicates said first lens belongs to a first lens type and fourth data depending on the characteristic of said first lens;

said second lens comprising means for outputting second data which indicates said second lens belongs to a second lens type and third data depending on the characteristic of said second lens, types of data in said third data including all types of data in said fourth data;

said camera body comprising:

means for inputting the data from the outputting means of said first or second lens attached to said camera body, means for discriminating the lens type based on whether the inputted data is the first or second data, means for storing fifth data depending on the characteristic of the lens belonging to the first lens type, types of data in said fifth data corresponding to types of data included in the third data but not included in the fourth data, and a processing means for carrying out a process based on the third data when the discriminating means judges the attached lens belongs to the second lens type and carrying out a process based on the fourth and fifth data when the discriminating means judges the attached lens belongs to the first lens type.

2. A camera system as claimed in claim 1, wherein the data with respect to the characteristic of said lens is data relating to a focus detection and the processing means is a focus detecting means.

3. A camera system as claimed in claim 2, wherein the focus detecting means detects a focus condition of a plurality of focus detection areas and wherein the data with respect to the characteristic of said lens indicates which of the focus detection areas is able to be used in the focus detection.

4. A camera system as claimed in claim 3, wherein the data with respect to the characteristic of said lens further indicates a different amount between a position of an actual focal plane and a position to be detected in the focus detecting means.

5. A camera system as claimed in claim 3, wherein the data with respect to the characteristic of said lens further indicates a correction amount of aberration with rays used in the focus detecting means.

6. A camera system as claimed in claim 1, wherein the data with respect to the characteristic of said lens relates to a measurement of light.

7. A camera system as claimed in claim 6, wherein the data with respect to the characteristic of said lens indicates a correction amount of the measurement of light in condition under a fully open aperture.

8. A camera system having a camera body and a first and second lenses exchangeable to said camera body, comprising:

said first lens comprising means for outputting first data which indicates said first lens belongs to a first lens type and fourth data depending on the characteristic of said first lens;

said second lens comprising means for outputting second data which indicates said second lens belongs to a second lens type and third data depending on the characteristic of said second lens, types of data in said third data including all types of data in said fourth data;

said camera body comprising:

means for inputting the data from the outputting means of said first or second lens attached to said camera body, a first storing means for storing data, a second storing means for storing data, a third storing means for storing fifth data depending on the characteristic of the lens belonging to the first lens type, types of data in said fifth data corresponding to types of data included in the third data but not included in the fourth data, means for storing the inputted first and second data in the first storing means, means for discriminating the lens type based on whether the stored data is the first or second data, and means for storing the inputted third data in the second storing means when the discriminating means judges the attached lens belongs to the second lens type and storing the fifth data stored in the third storing means in the second storing means when the discriminating means judges the attached lens belongs to the first lens type.

9. A camera system as claimed in claim 8, wherein the stored data in the second storing means is data relating to a focus detection.

10. A camera system as claimed in claim 9, wherein said camera body further comprises means for detecting a focus condition based on the stored data in the second storing means.

11. A camera system having a camera body capable of detecting each focus condition with respect to a plurality of focus detection areas, and a first and second lenses exchangeable to said camera body, comprising:

first means, provided in said first lens, for outputting data indicating which of the focus detection areas is able to be used in the focus detection by using light rays passed through said first lens;

second means, provided in said camera body, for judging whether a mounted lens is the first lens or the second lens;

third means, provided in said camera body, for storing data indicating which of the focus detection areas is able to be used in the focus detection by using light rays passed through said second lens;

fourth means, provided in said camera body, for deciding which of the focus detection areas is able to be used in the focus detection on the basis of the output results of the first means when the mounted lens is the first lens and on the basis of the output results of the third means when the mounted lens is the second lens; and fifth means, provided in said camera body, for calculating defocus amount with respect to the focus detection areas decided by the fourth means.

12. A camera system having a camera body and first and second lenses exchangeable to said camera body, comprising:

first means, provided in said camera body, for detecting each focus condition with respect to an axial focus detection area and an off-axial focus detection area by using light rays passed through said lens;

second means, provided in said first lens, for outputting first data indicating deviation between a film plane and the focus position based on the focus condition detected by the first means with respect to the axial focus detection area and outputting second data indicating deviation between the film plane and the focus position based on the focus condition detected by the first means with respect to the off-axial focus detection area;

third means, provided in said second lens, for outputting third data indicating deviation between the film plane and the focus position based on the focus condition detected by the first means with respect to the axial focus detection area;

fourth means, provided in said camera body for judging whether a mounted lens is the first lens or the second lens;

fifth means, provided in said camera body, for outputting fifth data indicating deviation between the film plane and the focus position based on the focus condition detected by the first means with respect to the off-axial focus detection area when the first means detects the focus condition by using light rays passed through said second lens; and sixth means, provided in said camera body, for calculating defocus amount on the basis of the output results of the second means when the mounted lens is the first lens and on the basis of the output results of the third and fifth means when the mounted lens is the second lens.

13. A camera system as claimed in claim 12, wherein said deviation between the film plane and the focus position is caused because a F-number of the lens used by the first means does not confirm to a fully open F-number.

14. A camera system as claimed in claim 12, wherein said deviation between the film plane and the focus position is caused because a wavelength of light rays used in the first means does not confirm to a wavelength of the light rays used at an exposure on a film.

* * * * *